US011957986B2

(12) United States Patent
Hale et al.

(10) Patent No.: US 11,957,986 B2
(45) Date of Patent: Apr. 16, 2024

(54) METHODS AND APPARATUSES FOR DYNAMIC DETERMINATION OF COMPUTER PROGRAM DIFFICULTY

(71) Applicant: UnitedHealth Group Incorporated, Minnetonka, MN (US)

(72) Inventors: Brendon Sean Hale, St. Paul, MN (US); Jared D. Martin, Minneapolis, MN (US); Laura Kirschbaum Kochevar, St. Paul, MN (US); Herk Anthony Confer, San Francisco, CA (US)

(73) Assignee: UnitedHealth Group Incorporated, Minnetonka, MN (US)

( * ) Notice: Subject to any disclaimer, the term of this patent is extended or adjusted under 35 U.S.C. 154(b) by 0 days.

(21) Appl. No.: 17/477,138

(22) Filed: Sep. 16, 2021

(65) Prior Publication Data
US 2022/0355209 A1 Nov. 10, 2022

Related U.S. Application Data

(60) Provisional application No. 63/201,606, filed on May 6, 2021.

(51) Int. Cl.
*A63F 13/798* (2014.01)
*A63F 13/537* (2014.01)

(52) U.S. Cl.
CPC .......... *A63F 13/798* (2014.09); *A63F 13/537* (2014.09)

(58) Field of Classification Search
CPC ...... A63F 13/798; A63F 13/537; A63F 13/67; A63F 13/21
See application file for complete search history.

(56) References Cited

U.S. PATENT DOCUMENTS

| 5,001,632 A | 3/1991 | Hall-Tipping |
| 5,362,069 A | 11/1994 | Hall-Tipping |

(Continued)

FOREIGN PATENT DOCUMENTS

| WO | 2016/069143 A1 | 5/2016 |
| WO | 2017/089345 A1 | 6/2017 |

OTHER PUBLICATIONS

"Video Games That Help Kids—How it Works," Mightier, (19 pages), (online), [Retrieved from the Internet Nov. 1, 2021] <URL: https://www.mightier.com/hiwage/>.

(Continued)

*Primary Examiner* — Steve Rowland
(74) *Attorney, Agent, or Firm* — Alston & Bird LLP

(57) ABSTRACT

There is a need to dynamically determine one or more levels of difficulty for a computer program associated with one or more levels of difficulty for a computer program associated with one or more dynamic difficulty tasks. In one example, embodiments comprise, during a user interaction session with a computer program, receiving a physiological evaluation data object. One or more physiological difficulty levels may be determined based at least in part on the physiological evaluation data object. One or more program control parameter values for one or more program control parameters may be determined based at least in part on the one or more physiological difficulty levels. User interface data for the computer program may be generated to enable rendering of an in-program experience of the computer program as adjusted by the one or more program control parameter values.

20 Claims, 11 Drawing Sheets

(56) References Cited

U.S. PATENT DOCUMENTS

| | | | |
|---|---|---|---|
| 5,377,100 A | 12/1994 | Pope et al. | |
| 5,462,504 A * | 10/1995 | Trulaske | A61B 5/222 482/901 |
| 6,705,972 B1 * | 3/2004 | Takano | G06N 3/006 482/7 |
| 6,902,513 B1 * | 6/2005 | McClure | A63B 24/0006 482/4 |
| 7,025,675 B2 * | 4/2006 | Fogel | A63F 13/69 463/9 |
| 7,070,539 B2 * | 7/2006 | Brown | G06F 13/4027 482/8 |
| 9,067,140 B2 * | 6/2015 | Opaluch | A63F 13/12 |
| 9,511,289 B2 | 12/2016 | Bond et al. | |
| 10,559,221 B2 | 2/2020 | Martucci et al. | |
| 10,632,387 B2 | 4/2020 | Tortosa et al. | |
| 10,835,823 B2 | 11/2020 | Sumant et al. | |
| 11,266,910 B2 * | 3/2022 | Wang | G06F 3/011 |
| 2002/0082065 A1 * | 6/2002 | Fogel | A63F 13/58 463/30 |
| 2002/0082077 A1 * | 6/2002 | Johnson | A63F 13/12 463/43 |
| 2004/0053690 A1 * | 3/2004 | Fogel | A63F 13/822 463/31 |
| 2006/0025282 A1 * | 2/2006 | Redmann | A61B 5/6804 482/8 |
| 2007/0066403 A1 | 3/2007 | Conkwright | |
| 2007/0167204 A1 * | 7/2007 | Lyle | A63F 13/79 463/9 |
| 2007/0239479 A1 * | 10/2007 | Arrasvuori | G16H 20/30 482/8 |
| 2008/0293491 A1 | 11/2008 | Wu et al. | |
| 2014/0004948 A1 * | 1/2014 | Watkins, Jr. | A63F 13/10 463/36 |
| 2014/0106877 A1 * | 4/2014 | Knutsson | A63F 13/46 463/31 |
| 2017/0112391 A1 * | 4/2017 | Stivoric | A61B 5/0022 |
| 2017/0206694 A1 * | 7/2017 | Jiao | G06V 40/174 |
| 2017/0357417 A1 * | 12/2017 | Goossens | G06F 3/04883 |
| 2018/0070872 A1 | 3/2018 | Simon | |
| 2018/0078858 A1 * | 3/2018 | Chai | A63F 13/216 |
| 2018/0350144 A1 * | 12/2018 | Rathod | H04W 4/021 |
| 2019/0001223 A1 * | 1/2019 | Blackstock | A63F 13/35 |
| 2019/0015751 A1 | 1/2019 | Kahn, II et al. | |
| 2019/0094981 A1 * | 3/2019 | Bradski | G06F 3/017 |
| 2019/0204907 A1 * | 7/2019 | Xie | G06F 3/017 |
| 2019/0270018 A1 * | 9/2019 | Evans | A63F 13/79 |
| 2020/0019242 A1 * | 1/2020 | Atlas | G06N 20/00 |
| 2020/0193857 A1 | 6/2020 | Stephens et al. | |
| 2020/0342648 A1 * | 10/2020 | Shimizu | G06F 3/015 |

OTHER PUBLICATIONS

"Video Games That Help Kids," Mightier, (11 pages), (online), [Retrieved from the Internet Nov. 1, 2021] <URL: https://www.mightier.com/>.

Hristova, Dayana. "Dynamic Difficulty Adjustment (DDA) in First Person Shooter (FPS) Games," Academia, (2017), pp. 1-6.

Parnandi, Avinash et al. "A Comparative Study of Game Mechanics and Control Laws for an Adaptive Physiological Game," Journal on Multimodal User Interfaces, Mar. 2015, vol. 9, No. 1, pp. 31-42.

* cited by examiner

METHODS AND APPARATUSES FOR DYNAMIC DETERMINATION OF COMPUTER PROGRAM DIFFICULTY

CROSS-REFERENCES TO RELATED APPLICATION(S)

The present application claims priority to U.S. Provisional Patent Application No. 63/201,606 (filed May 6, 2021), which is incorporated herein by reference in its entirety.

BACKGROUND

Various embodiments of the present invention address technical challenges related to dynamic determination of computer game difficulty. Through dynamic determination of computer game difficulty, user experience during gameplay and content retention may be improved as well as encourage the building of neural pathways in the brain.

BRIEF SUMMARY

In general, embodiments of the present invention provide methods, apparatuses, systems, computing devices, computing entities, and/or the like for dynamically determining one or more levels of difficulty for a computer program associated with one or more dynamic difficulty tasks.

In accordance with one aspect, a method comprises: during a user interaction session with the computer program: during a user interaction session with the computer program: receiving, using one or more processors, a physiological evaluation data object from one or more physiological sensors corresponding to the user interaction session, wherein the physiological evaluation data object comprises one or more physiological evaluation measurements for the user interaction session; determining, based at least in part on the physiological evaluation data object and using the one or more processors, one or more physiological difficulty level values; determining, based at least in part on the one or more physiological difficulty level values and using the one or more processors, one or more program control parameter values for one or more program control parameters associated with the computer program; and generating, using the one or more processors, user interface data for the computer program, wherein the user interface data enables rendering the in-program experience of the computer program as adjusted by the one or more program control parameter values.

In accordance with another aspect, an apparatus comprising at least one processor and at least one memory including program code, the at least one memory and the program code configured to, with the processor, cause the apparatus to at least: during a user interaction session with the computer program: receive a physiological evaluation data object from one or more physiological sensors corresponding to the user interaction session, wherein the physiological evaluation data object comprises one or more physiological evaluation measurements for the user interaction session; determine, based at least in part on the physiological evaluation data object, one or more physiological difficulty level values; determine, based at least in part on the one or more physiological difficulty level values, one or more program control parameter values for one or more program control parameters associated with the computer program; and generate user interface data for the computer program, wherein the user interface data enables rendering the in-program experience of the computer program as adjusted by the one or more program control parameter values.

In accordance with yet another aspect, a computer program product computer program comprising at least one non-transitory computer-readable storage medium having computer-readable program code portions stored therein, the computer-readable program code portions configured to: during a user interaction session with the computer program: receive a physiological evaluation data object from one or more physiological sensors corresponding to the user interaction session, wherein the physiological evaluation data object comprises one or more physiological evaluation measurements for the user interaction session; determine, based at least in part on the physiological evaluation data object, one or more physiological difficulty level values; determine, based at least in part on the one or more physiological difficulty level values, one or more program control parameter values for one or more program control parameters associated with the computer program; and generate user interface data for the computer program, wherein the user interface data enables rendering the in-program experience of the computer program as adjusted by the one or more program control parameter values.

BRIEF DESCRIPTION OF THE DRAWINGS

Figure 1:
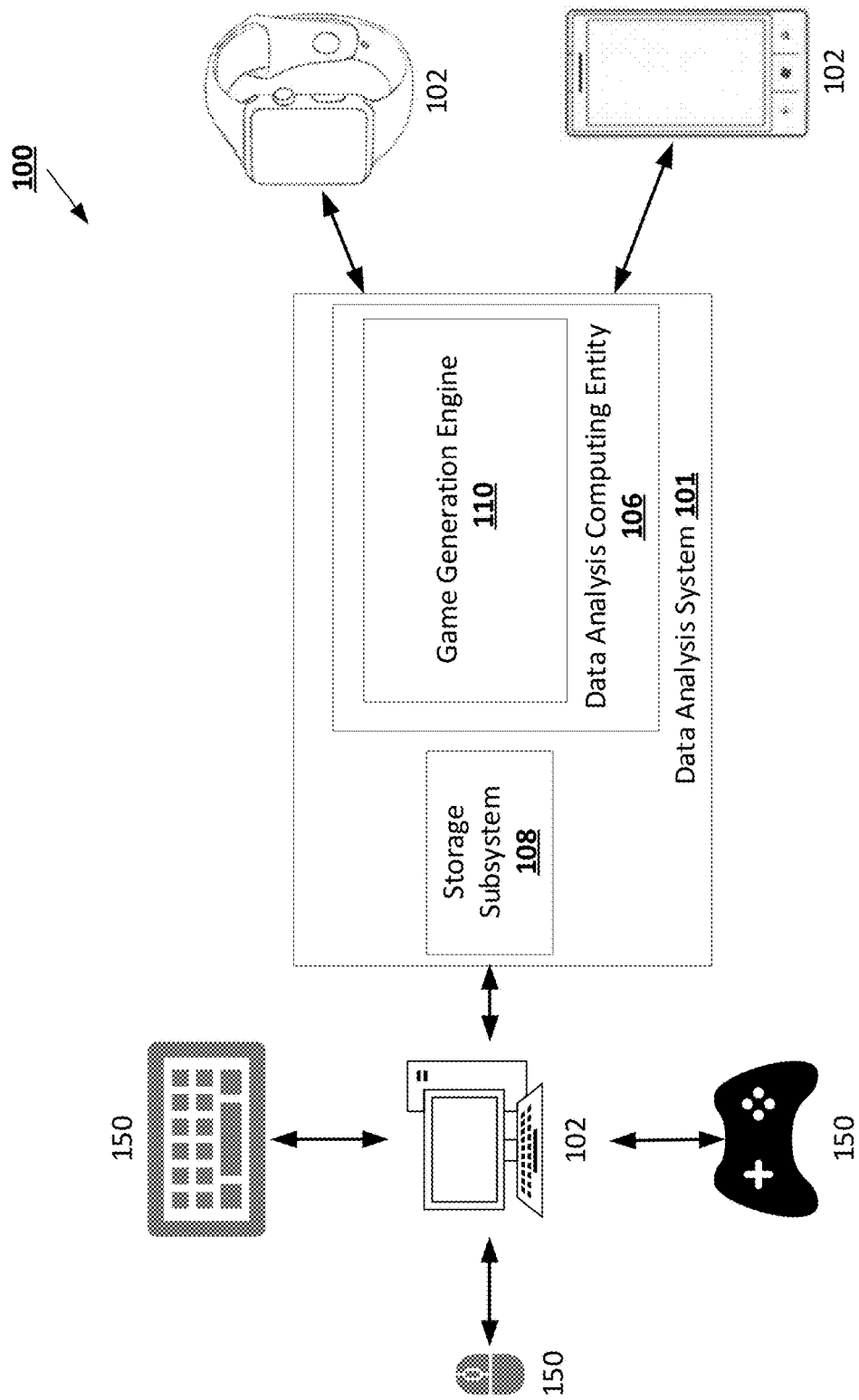
Figure 2:
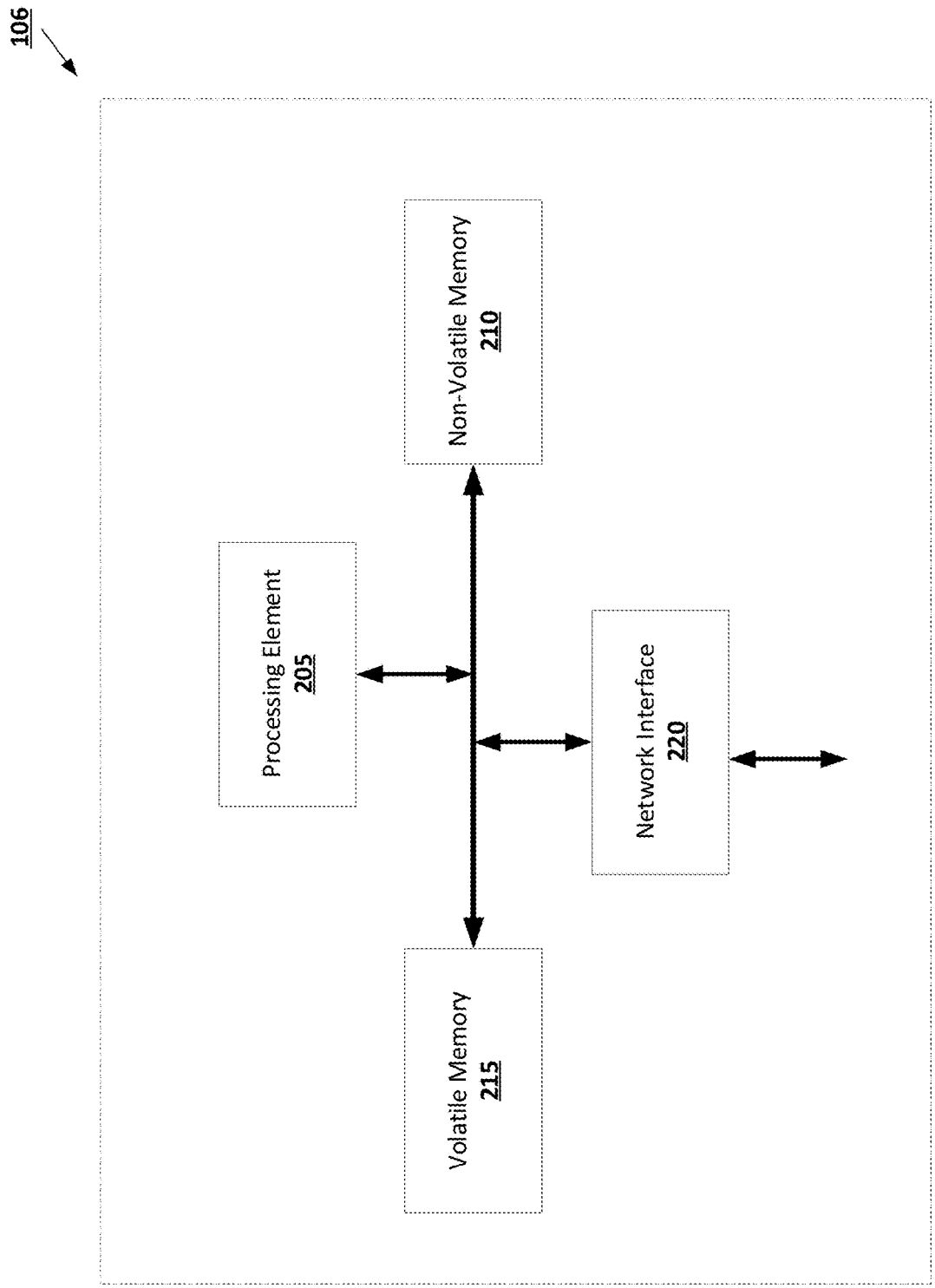
Figure 3:
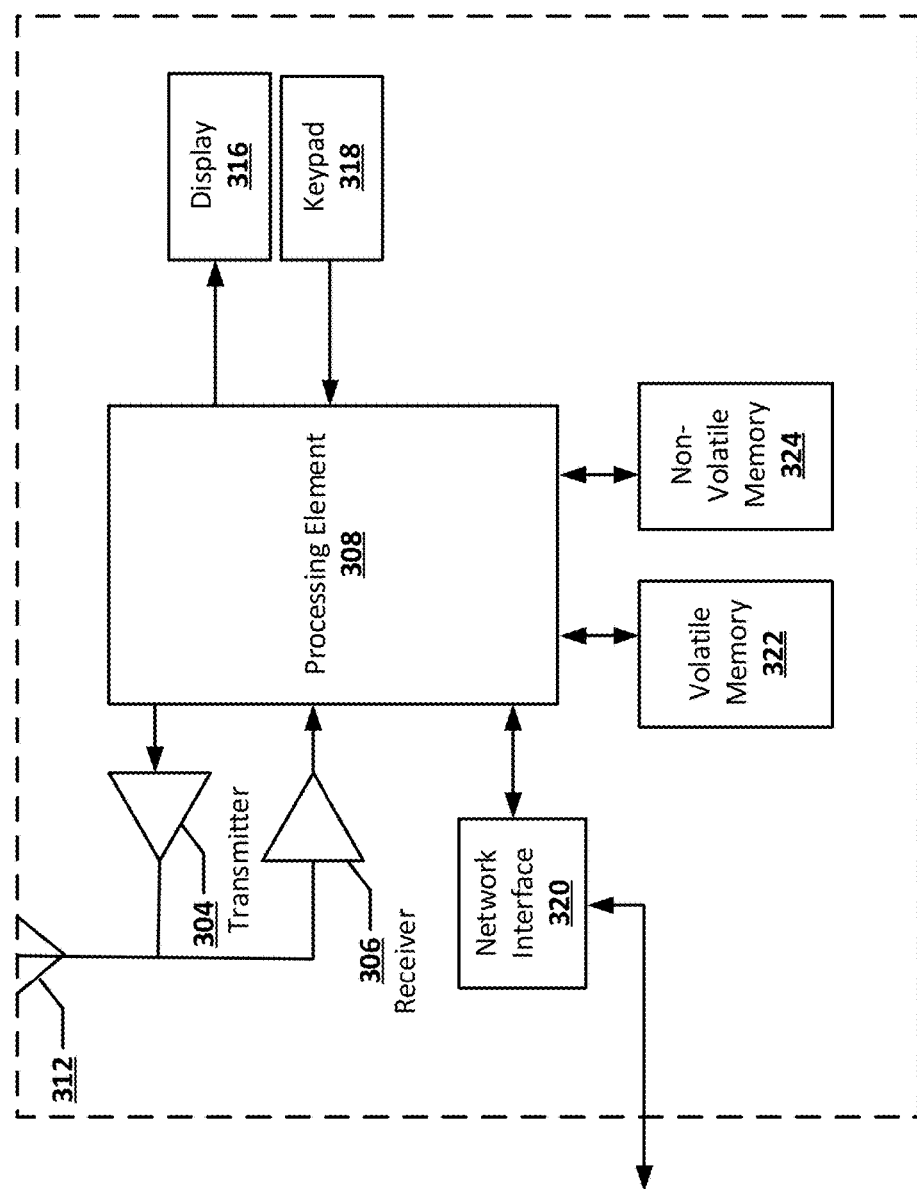
Figure 4:
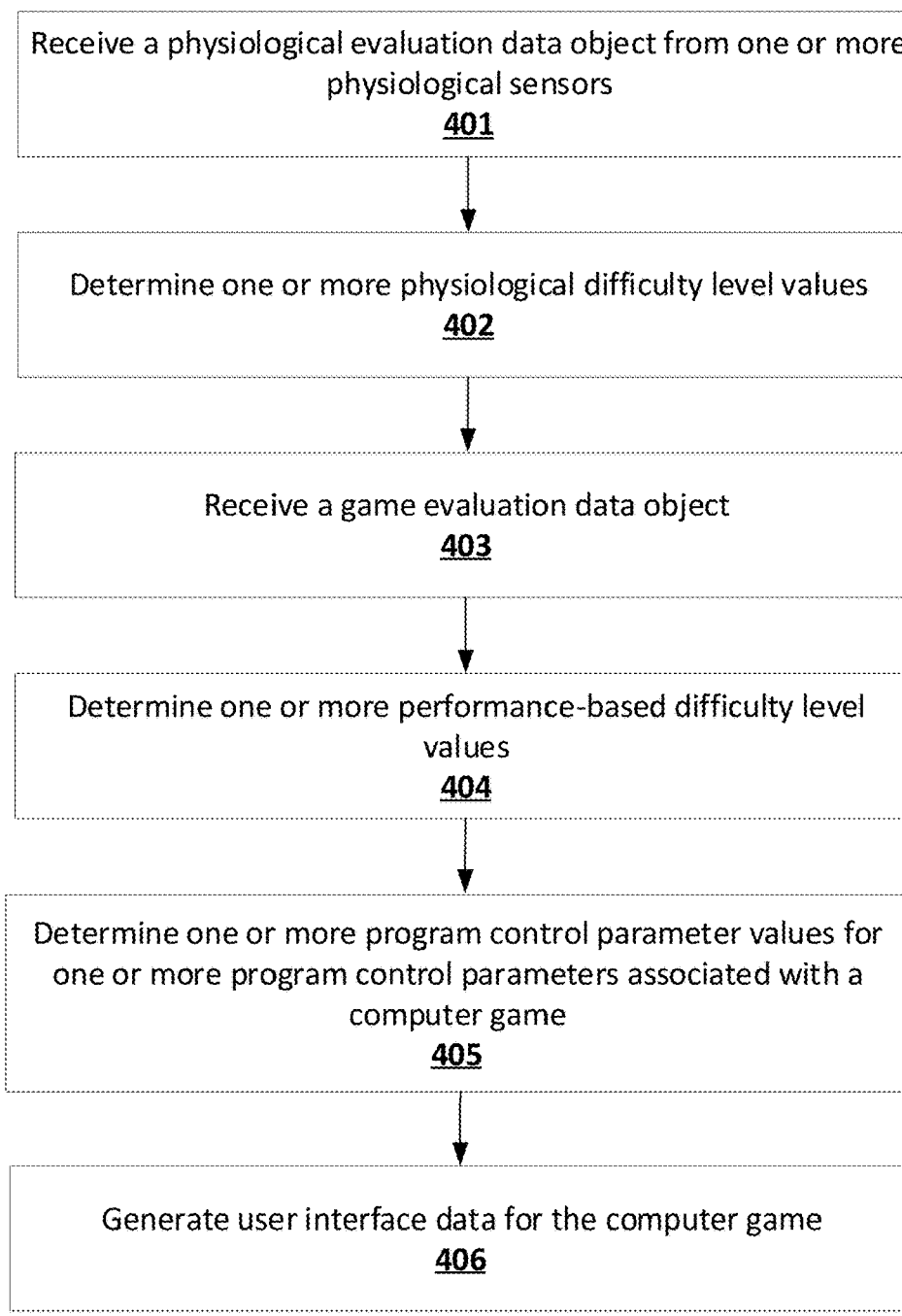
Figure 5:
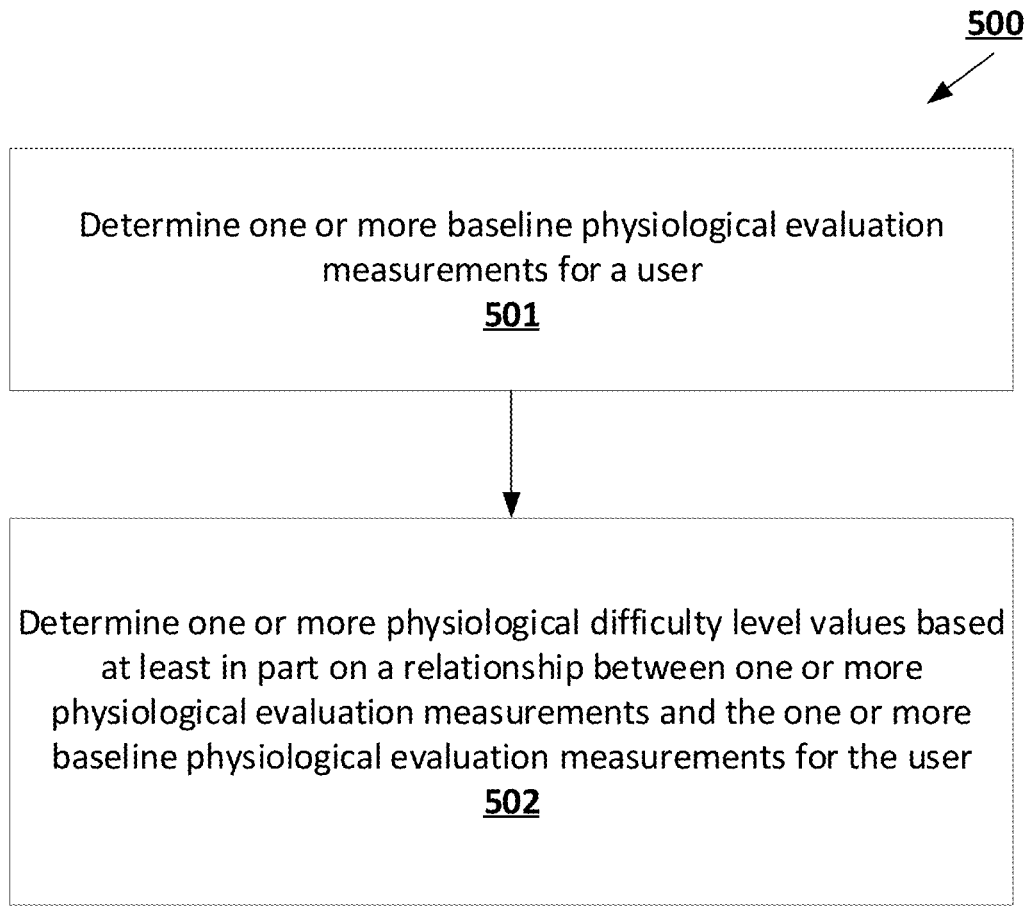
Figure 6:
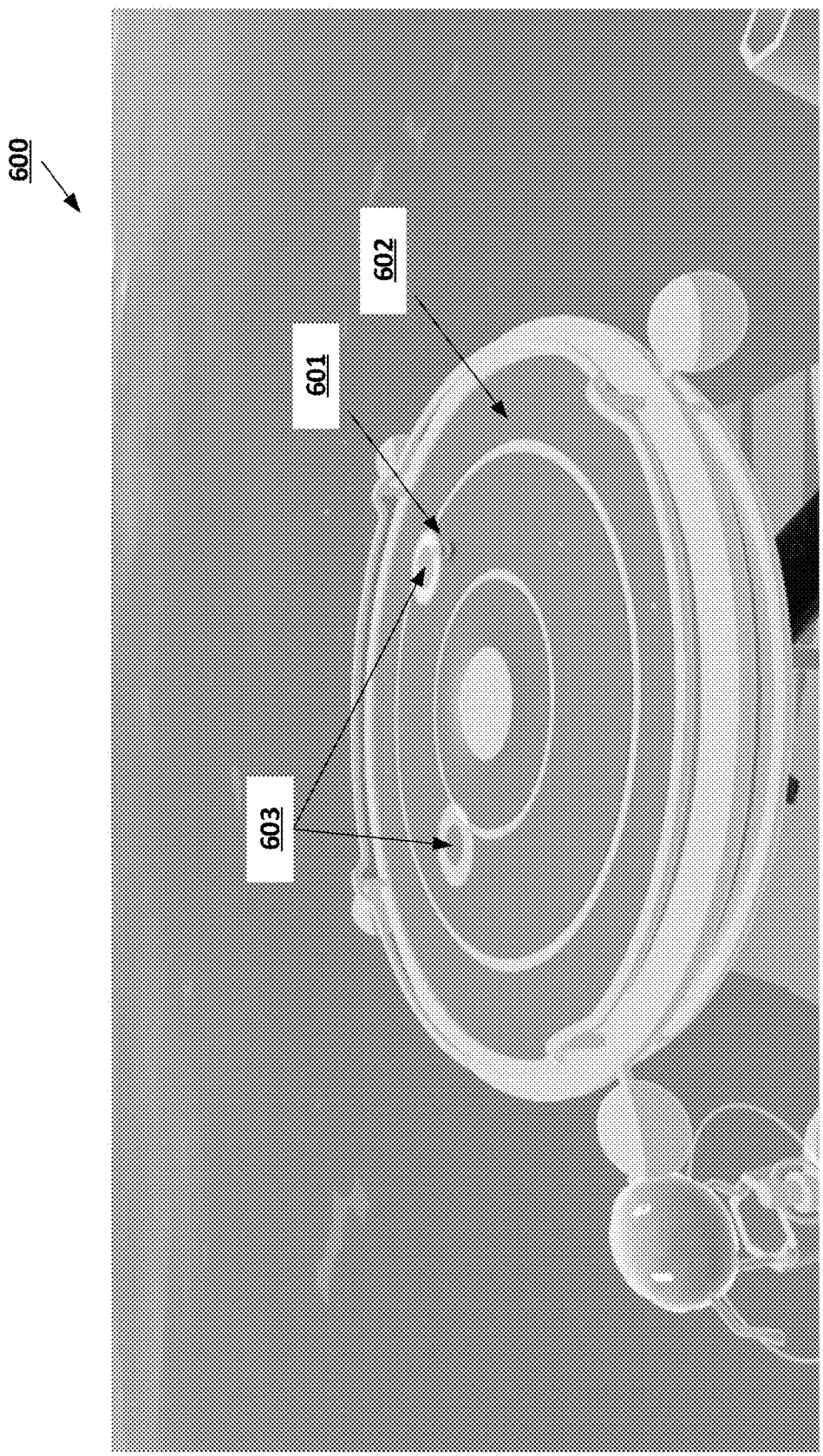
Figure 7A:
Figure 7B:
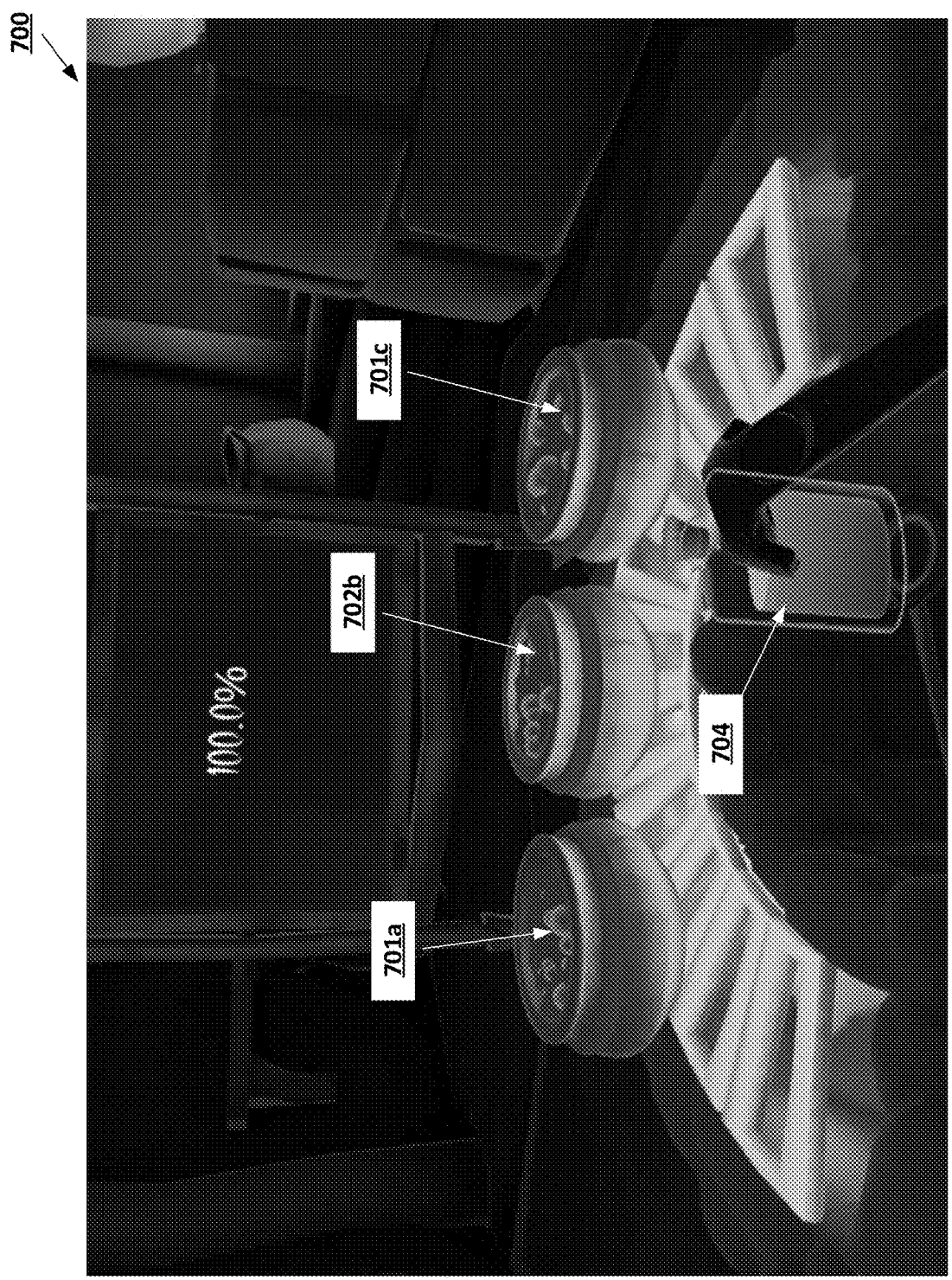
Figure 8:
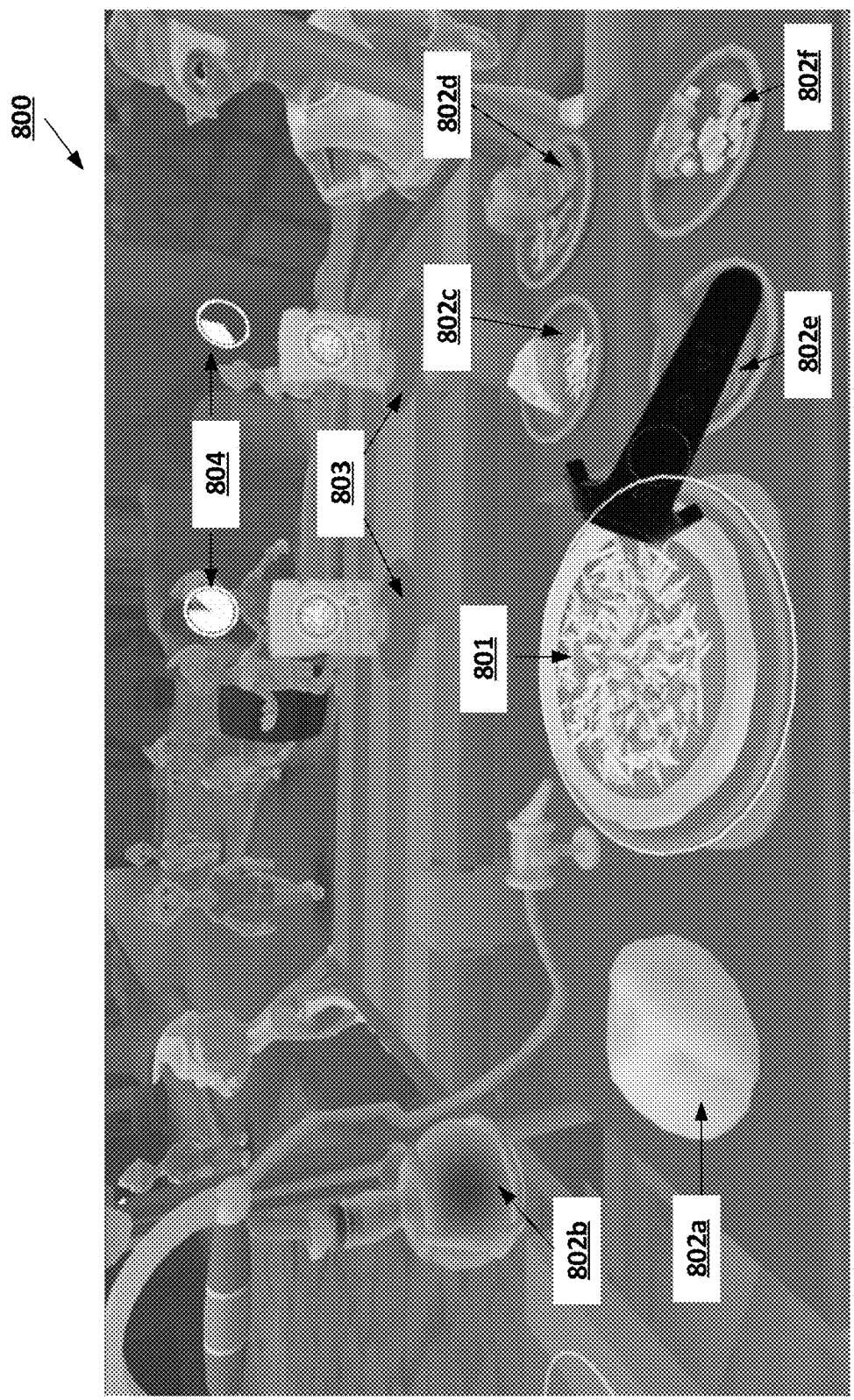
Figure 9A:
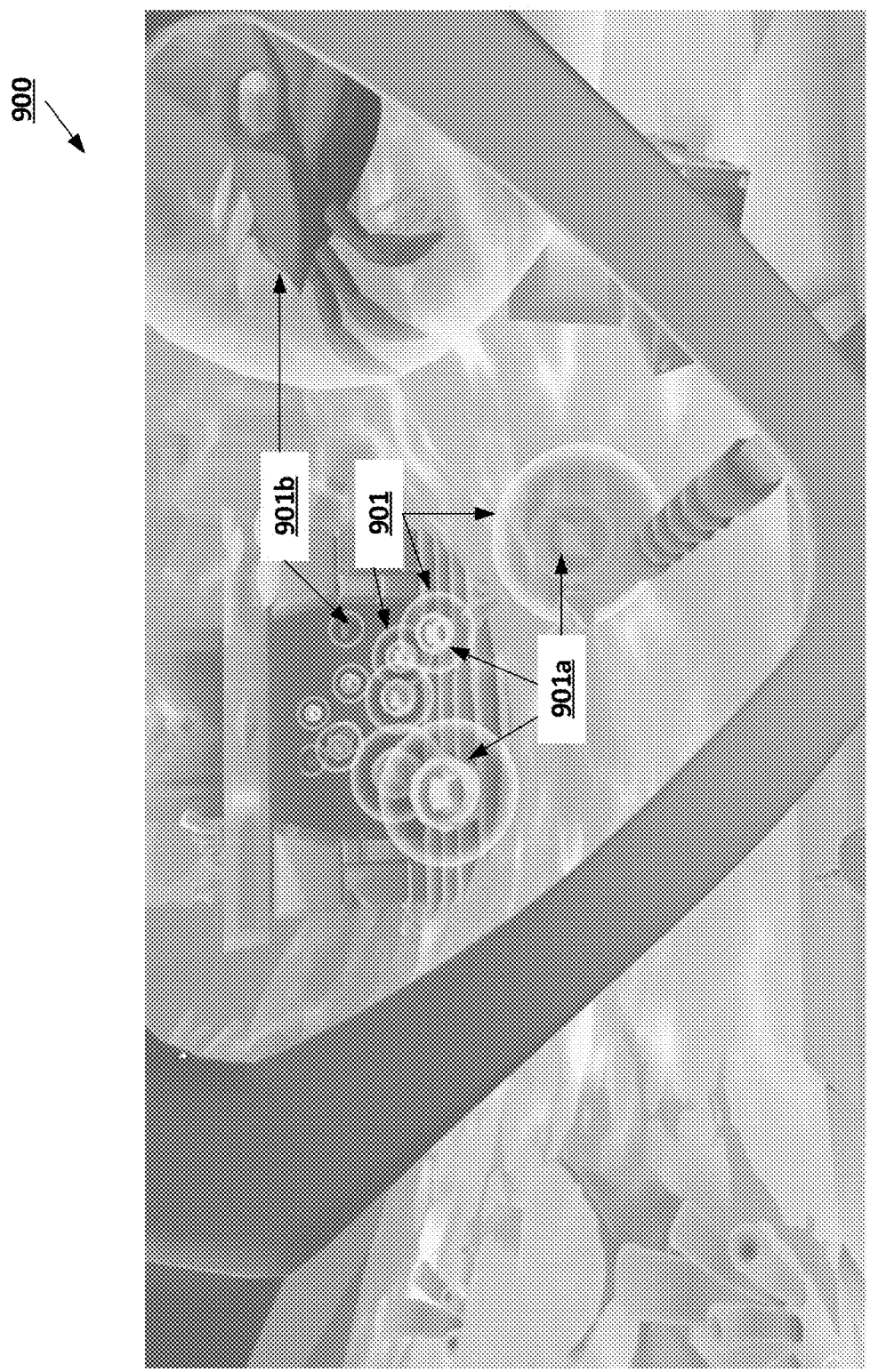
Figure 9B:
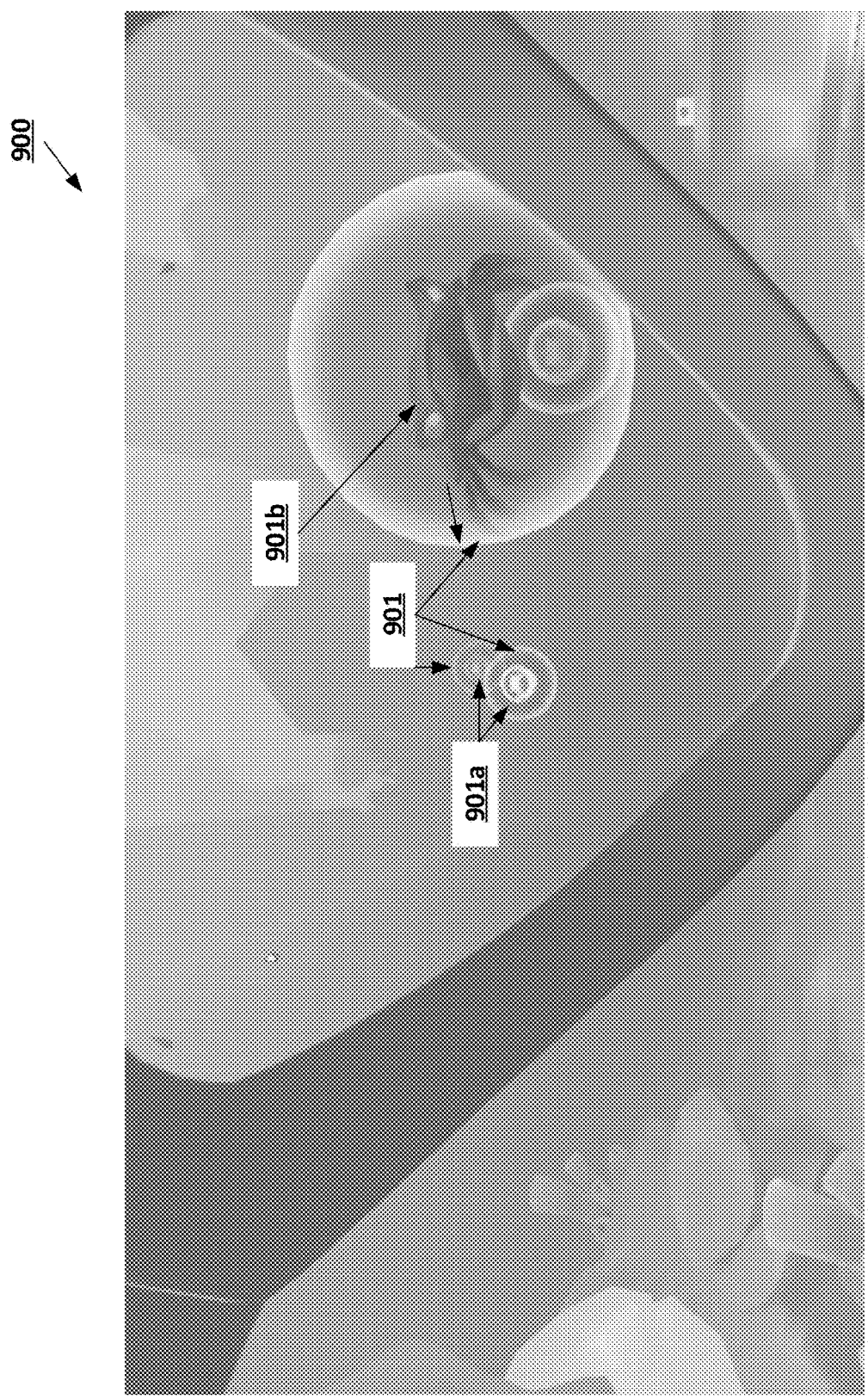

Having thus described the invention in general terms, reference will now be made to the accompanying drawings, which are not necessarily drawn to scale, and wherein:

FIG. 1 provides an exemplary overview of an architecture that can be used to practice embodiments of the present invention;

FIG. 2 provides an example data analysis computing entity in accordance with some embodiments discussed herein;

FIG. 3 provides an example external computing entity in accordance with some embodiments discussed herein;

FIG. 4 is a flowchart diagram of an example process for generating user interface data that is configured to enable the rendering of an in-game experience of a computer game in accordance with some embodiments discussed herein;

FIG. 5 is a flowchart diagram of an example process for determining one or more physiological difficulty levels for a user interaction session of a computer game in accordance with some embodiments discussed herein;

FIG. 6 provides an operational example of an attention focus computer game in accordance with some embodiments discussed herein;

FIGS. 7A-B provide operational examples of a working memory computer game in accordance with some embodiments discussed herein;

FIG. 8 provides an operational example of a stress management computer game in accordance with some embodiments discussed herein; and FIGS. 9A-B provide operational examples of a vagal response computer game in accordance with some embodiments discussed herein.

DETAILED DESCRIPTION

Various embodiments of the present invention are described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to data analysis, one of ordinary skill in the art will recognize that the disclosed concepts can be used to perform other types of data analysis.

I. Overview and Technical Advantages

Various embodiments of the present invention address technical challenges related to efficiency and reliability of computer game platforms by enabling dynamic adjustment of game difficulty. For example, various game platforms that do not dynamically adjust game difficulty suffer from efficiency and reliability drawbacks resulting from users aborting games with unsuitable difficulty modes and restarting games with different difficulty modes, operations that can impose significant computational burdens on the game platforms. Various embodiments of the present invention reduce or eliminate the number of abort/restart operations and in doing so improve efficiency and reliability of computer game platforms.

Computer games allow for a controllable environment to be experienced by the user and as such, they provide an effective platform to facilitate user learning experiences. Users may learn more efficiently and effectively during particular physiological states. For example, users which are engaged with an in-game experience and in a positive emotional state may retain more information than users who are otherwise not engaged with an in-game experience and/or are experiencing a negative emotional state, such as stress, frustration, dissatisfaction, and/or the like. Further, a user who is challenged with a sufficient level of difficulty while interacting with a computer game may increase the building of his/her neural pathways in the brain, leading to improved content retention. However, computer game difficulty is subjective to individual users such that tasks perceived as easy to one user may be perceived as difficult to another user, thus making it challenging to provide appropriate in-game experiences for different users of the computer game.

In some embodiments, computer games described herein have one or more associated tasks the user is expected to complete, and these associated tasks are influenced by one or more game parameters. The game parameters associated with a particular computer game may directly or indirectly influence the difficulty of the one or more associated tasks and may thus influence the user's overall experience. Computer games with associated tasks that may be perceived as too easy, may lead to a user becoming bored with the computer game, leading to user dissatisfaction. Conversely, computer games with associated tasks that may be perceived as too difficult, may lead to a user becoming frustrated with the computer game, similarly leading to user dissatisfaction. As such, consideration of the difficulty of the one or more tasks as influenced by the one or more parameters that is perceived by an individual user is important to ensure the user remains engaged with the computer game and sufficiently challenged by the one or more tasks throughout his/her in-game experience.

Conventionally, computer games have allowed a user to manually select game difficulty, which may influence a variety of game parameters. For example, prior to starting an in-game computer game experience, a user may select a difficulty level such as easy, medium, hard, expert, and/or the like. However, this requires a user to estimate their game performance ability prior to starting the game, which may be unrealistic and may require the user to restart their in-game experience to a more appropriate level of difficulty in an instance he/she incorrectly estimates his/her abilities.

To address the above-noted challenges, various embodiments of the present invention enable dynamic adjustment of game difficulty based at least in part on at least one of user physiological data and game evaluation data. Consideration of user physiological feedback during an in-game experience may allow for further insight into the perceived level of difficulty experienced by a user. Furthermore, such consideration of user physiological feedback allows for the determination of a user's physiological state, such that the game difficulty may be altered to encourage a user to experience the computer game while in a physiological state where he/she may learn more efficiently and/or effectively. Various embodiments of the present invention address technical challenges related to dynamically determining one or more levels of difficulty for a computer game associated with one or more dynamic difficulty tasks and generating user interface data for the computer game. For example, in some embodiments, proposed solutions disclose determining one or more physiological difficulty level values based at least in part on a received physiological evaluation data object from one or more physiological sensors corresponding to the user interaction session. A determination of one or more program control parameters values for one or more program control parameters associated with the computer game may then be determined based at least in part on the one or more physiological difficulty level values. User interface data for the computer game may be generated to enable rendering of an in-game experience of the computer game as adjusted by the one or more program control parameter values. In doing so, various embodiments of the present invention address shortcomings of existing computer game difficulty determinations and enable solutions that are capable of dynamically determining one or more levels of difficulty for a computer game for a user.

II. Definitions of Certain Terms

The term "user interaction session" may refer to an electronically-managed data construct configured to enable/manage one or more interactions between a computer game and a user. In some embodiments a computer game may be displayed to a user via a user interface. A user may interact with the computer game using one or more game control devices. During the user interaction sessions, a user may be presented with one or more game objects, environments, characters, and/or the like and be prompted to accomplish one or more dynamic difficulty tasks. The difficulty associated with the one or more dynamic difficulty tasks may be determined based at least in part on one or more program control parameter values for one or more associated program control parameters. The one or more associated program control parameters may be influenced by the one or more physiological difficulty level values and/or one or more performance-based difficulty level values. For example, an attention focus computer game may present the user with a user-controlled marble on a user movable platform with one or more moving marble targets. The user may be prompted to move the user-controlled marble within a defined region defined by the position of at least one of the one or more moving marble targets by controlling the user movable platform. The one or more control parameters may comprise an angular drag of the user-controllable marble, a speed of the one or more moving targets, and the size of the one or more moving targets. As another example, a working memory computer game may present the user with one or more colored receptacles, with each colored receptacle being associated with a different color as well as a colored placement item with an associated color that matches a color of a single colored receptacle. After a period of time, the user may no longer be presented with the color of each colored receptacle and therefore must rely on his/her memory to determine the color corresponding to each receptacle. The user may be prompted to place the colored placement item in the corresponding colored receptacle. After a transformer time duration is met, a transforming object may provide a new colored placement item in one or more of the colored receptacles, thus altering the associated color of the corresponding colored receptacle. The one or more control parameters may include a transformer time duration and the number of colored receptacles. As another example, a stress management computer game may present the user with one or more interactable ingredients with which a user may construct a custom item. The user may be prompted to fulfill one or more custom item orders within an associated time frame. A stress meter may accumulate over time and once an upper stress meter threshold has been satisfied, which may trigger a superpower mode wherein the user may receive assistance in fulfilling the one or more custom item orders. The one or more control parameters may include an accumulation rate for the stress meter. As yet another example, a vagal response computer game may present the user with one or more interactable bubbles which may contain a positive reward item or negative reward item. The user may be prompted to interact with the bubbles containing the positive reward items while avoiding bubbles containing negative reward items. The environmental clarity presented to the user may be altered to control the distance from which a user is able to perceive the bubbles and/or the reward items contained within the bubbles. The one or more control parameters may include an environmental clarity value, a count of bubbles at a given time, an associated bubble speed, and a percentage of bubbles containing negative reward items.

The term "program control parameter" may refer to an electronically-managed data construct that is configured to describe one or more parameters that affect perceived difficulty of an in-game experience of a particular computer game. In some embodiments, a program control parameter may relate to an object, an object characteristic, an environmental feature, user capabilities during the user interactions session, and/or the like for the computer game. In some embodiments, the one or more program control parameters for a particular computer game may be defined by computer game definition data. In some embodiments, a program control parameter may influence the difficulty of one or more dynamic difficulty tasks associated with a particular computer game. In some embodiments, a program control parameter may correspond to a physiological program control parameter and/or a performance-based program control parameter. If the program control parameter corresponds to a physiological program control parameter, the program control parameter may be determined based at least in part on one or more physiological difficulty level values. If the program control parameter corresponds to a performance-based program control parameter, the program control parameter may be determined based at least in part on one or more performance-based difficulty level values. Some program control parameters may correspond to both a physiological program control parameter and a performance-based program control parameter. Some program control parameters may not correspond to either a physiological program control parameter or a performance-based program control parameter.

The term "dynamic difficulty task" may refer to an electronically-managed data construct that is configured to describe a set of operations for a user to complete for a particular computer game, where a perceived difficulty of the noted operations may be adjustable based at least in part on one or more program control parameter values. In some embodiments, the dynamic difficulty task may be determined based at least in part on one or more program control parameters for the computer game. In some embodiments the difficulty of the dynamic difficulty task is influenced by one or more physiological evaluation measurements and/or one or more game performance measurements for the user. In some embodiments, the one or more physiological evaluation measurements for the user interaction session comprise a heart rate measurement for the user; and the one or more game evaluation measurements for the user interaction session comprise a user-controlled marble precision with respect to one or more moving targets. In some of the noted embodiments, the one or more program control parameters comprise a first subset comprising a user-controlled marble drag and a moving target speed; the one or more program control parameters comprise a second subset comprising a moving target size; the first subset is determined based at least in part on the one or more physiological difficulty level values; and the second subset is determined based at least in part on the one or more performance-based difficulty level values. In some embodiments, the one or more physiological evaluation measurements for the user interaction session comprise a heart rate measurement for the user; and the one or more game evaluation measurements for the user interaction session comprise a placement accuracy measure describing an accuracy of previous placements by the user with respect to one or more colored receptacles. In some of the noted embodiments, the one or more program control parameters comprise a transformer time duration that is determined based at least in part on the heart rate measure; and the one or more program control parameters further comprise a number of colored receptacles that is determined based at least in part on the placement accuracy measure. In some embodiments, the one or more physiological evaluation measurements for the user interaction session comprise a heart rate measurement for the user; and the one or more game evaluation measurements for the user interaction session comprise a pending order count describing a number of pending custom item orders and a failed order count describing a number of failed custom item order fulfilments. In some of the noted embodiments, the one or more program control parameters comprise a stress meter accumulation rate that is determined based at least in part on the heart rate measurement, the pending order count, and the failed order count. In some embodiments, the one or more physiological evaluation measurements for the user interaction session comprise a heart rate measurement for the user; and the one or more game evaluation measurements for the user interaction session comprise a bubble interaction accuracy measure describing an accuracy of user interaction with respect to one or more interactable bubbles. In some of the noted embodiments, the one or more program control parameters comprise an environmental clarity that is determined based at least in part on the heart rate measurement; and the one or more program control parameters comprise a count of interactable bubbles, an interactable bubble speed, and a count of bubbles containing negative reward items, at least one of which is determined based at least in part on the bubble interaction accuracy measure.

The term "physiological evaluation data object" may refer to an electronically-received data construct that is configured to describe one or more physiological measurements for a user interaction session. In some embodiments, the physiological evaluation data object includes one or more physiological evaluation measurements for a user during a user interaction session. In some embodiments, the one or more physiological evaluation measurements are each associated with a timestamp indicative of when the physiological evaluation measurement was measured. The physiological evaluation data object may be received from one or more physiological sensors associated with the user. A physiological evaluation measurement may correspond to a user heart rate, blood pressure, breathing rate, skin perspiration, pupil dilation, and/or the like. In some embodiments, one or more physiological difficulty level values may be determined based at least in part on the physiological evaluation data object. The one or more physiological difficulty level values may influence one or more program control parameter values for one or more program control parameters associated with a computer game.

The term "baseline physiological evaluation measurement" may refer to an electronically-received data construct that is configured to describe a physiological measurements for one or more physiological evaluation measurements associated with a user during period in which the user is not presented with one or more dynamic difficulty task. In some embodiments, each baseline physiological evaluation measurement may be stored in a corresponding user profile such that the baseline physiological evaluation measurements for the user may be retrieved each time that the user enters a user interaction session with the computer game. In some embodiments, the baseline physiological evaluation measurement for each physiological evaluation measurement for the user may be determined by receiving one or more physiological evaluation measurements from one or more physiological sensors associated with the user when the user is not performing one or more dynamic difficulty tasks associated with the computer program. For example, a baseline physiological evaluation measurement may correspond to a user heart rate, blood pressure, breathing rate, skin perspiration, pupil dilation, and/or the like that is recorded/obtained when a user is at rest.

The term "game evaluation data object" may refer to an electronically-received data construct that is configured to describe one or more game evaluation measurements associated with a user during a user interaction session for a computer game. In some embodiments, the one or more game evaluation measurements are each associated with a timestamp. The game evaluation data object may be received from one or more external computing entities associated with the user interaction session. In some embodiments, the game evaluation data object may be indicative of the user's past performance with respect to one or more dynamic difficulty tasks associated with the computer program. In some embodiments, a game evaluation measurement may correspond to an accuracy and/or speed associated with the user completing the one or more dynamic difficulty tasks associated with the computer program.

The term "physiological difficulty level value" may refer to an electronically-managed data construct that is configured to describe an inferred measure of existing difficulty of an in-game experience of a computer game that is determined based at least in part on physiological measurements of a user interaction session for the computer game. An operational example of a physiological difficulty level is the output of a proportional-integral-derivative (PID) controller that is determined based at least in part on a user's heart rate. For example, the PID controller output may be determined in a manner such that the setpoint of the PID controller output is 105% of the user's baseline heart rate, where the proportional, integral, and derivative gains of the PID controller are set at 0.5, 0.0, and 0.0 respectively, and where the minimum and maximum value for the PID controller outputs are −2 and +2 respectively. Another example of a physiological difficulty level is a measure that indicates whether a detected heart rate of a user satisfies a heart rate threshold. A yet another example of a physiological difficulty value is a measure of a ratio between an observed heart rate value of a user and a maximum observed heart rate value of a user.

The term "performance-based difficulty level value" may refer to an electronically-managed data construct that is configured to describe an inferred measure of existing difficulty of an in-game experience of a computer game that is determined based at least in part on game evaluation measurements of a user interaction session for the computer game. An operational example of a game difficulty value is a game difficulty value that describes one or more game difficulty measures. Another operational example of a game difficulty value is the output of PID controller that is determined based at least in part on a past player performance measure. For example, the output of the a PID controller may be determined based at least in part on observed user accuracy with respect to completion of the dynamic difficulty tasks associated with the computer game. In some embodiments, the set point of the PID controller may be 0.5, the proportional, integral, and derivative gains of the PID controller may be set at 4.0, 0.0, and 0.0 respectively, and the minimum and maximum values of the PID controller may be −1 and +2 respectively.

III. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatuses, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Framework

FIG. 1 provides an example system architecture 100 that can be used in conjunction with various embodiments of the present disclosure. As shown in FIG. 1, the system architecture 100 may comprise a data analysis system 101 connected to one or more external computing entities 102. The one or more external computing entities may comprise one or more computers, wearable devices, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. Each of the components of the system may be in electronic communication with, for example, one another over the same or different wireless or wired networks including, for example, a wired or wireless Personal Area Network (PAN), Local Area Network (LAN), Metropolitan Area Network (MAN), Wide Area Network (WAN), and/or the like. Additionally, while FIG. 1 illustrates certain system devices as separate, standalone devices, the various embodiments are not limited to this particular architecture. f In some embodiments, the data analysis system 101 may be connected to one or more external computing entities 102 that are connected to one or more game control devices 150. In some embodiments, the one or more game control devices may additionally or alternatively be connected to data analysis system 101. The one or more game control devices may include an electronic device which accepts user input to allow a user to interact with a computer game during a user interaction session. The one or more game control devices may comprise one or more keyboards, mouses, keypads, console controllers, virtual reality (VR) headsets, the like, and/or any combination of devices or entities adapted to perform the functions, steps/operations, and/or processes described herein. The one or more game control devices may be wired and/or wirelessly connected to one or more external computing entities 102 and/or data analysis system 101.

The system architecture 100 includes a data analysis system 101 comprising a data analysis computing entity 106 configured to at least generate user interface data for a computer game. The data analysis system 101 may communicate with one or more external computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The system architecture 100 includes a storage subsystem 108 configured to store at least a portion of the data utilized by the data analysis system 101. The data analysis computing entity 106 may be in communication with one or more external computing entities 102. The data analysis computing entity 106 may be configured to determine one or more program control parameters for one or more computer games based at least in part on computer game data stored in the storage subsystem 108 and utilize the stored computer game data and/or one or more determined program control parameters to generate user interface data for the one or more corresponding computer games. The storage subsystem may be configured to store one or more computer game definition data, including one or more control parameter determination algorithms, one or more dynamic difficulty tasks, and/or the like. for the one or more computer games. The data analysis computing entity 106 may be configured to receive requests and/or data from external computing entities 102, process the requests and/or data to generate outputs and provide the outputs to the external computing entities 102. The external computing entity 102 may periodically update/provide raw input data (e.g., physiological evaluation data objects and/or game evaluation data objects) to the data analysis system 101.

The storage subsystem 108 may be configured to store at least a portion of the data utilized by the data analysis computing entity 106 to perform data analysis steps/operations and tasks. The storage subsystem 108 may be configured to store at least a portion of operational data and/or operational configuration data including operational instructions and parameters utilized by the data analysis computing entity 106 to perform data analysis steps/operations in response to requests. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

The data analysis computing entity 106 includes a game generation engine 110. The game generation engine 110 may be configured to perform data analysis based at least in part on a received physiological evaluation data objects and/or game evaluation data object. For example, the game generation engine 110 may be configured to determine one or more physiological difficulty level values, game difficulty level indications, one or more program control parameters, and user interface data for one or more computer games based at least in part on the received physiological evaluation data objects and/or game evaluation data object and the computer game definition data stored in the storage subsystem 108.

Exemplary Data Analysis Computing Entity

FIG. 2 provides a schematic of a data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. Such functions, steps/operations, and/or processes may include, for example, transmitting, receiving, operating on, processing, displaying, storing, determining, creating/generating, monitoring, evaluating, comparing, and/or similar terms used herein interchangeably. In one embodiment, these functions, steps/operations, and/or processes can be performed on data, content, information, and/or similar terms used herein interchangeably.

As indicated, in one embodiment, the data analysis computing entity 106 may also include a network interface 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the data analysis computing entity 106 may include or be in communication with a processing element 205 (also referred to as processors, processing circuitry, and/or similar terms used herein interchangeably) that communicate with other elements within the data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the data analysis computing entity 106 may further include or be in communication with non-volatile media (also referred to as non-volatile storage, memory, memory storage, memory circuitry and/or similar terms used herein interchangeably). In one embodiment, the non-volatile storage or memory may include at least one non-volatile memory 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the data analysis computing entity 106 may further include or be in communication with volatile media (also referred to as volatile storage, memory, memory storage, memory circuitry and/or similar terms used herein interchangeably). In one embodiment, the volatile storage or memory may also include at least one volatile memory 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the data analysis computing entity 106 with the assistance of the processing element 205 and operating system.

As indicated, in one embodiment, the data analysis computing entity 106 may also include a network interface 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the data analysis computing entity 106 may be configured to communicate via wireless client communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the data analysis computing entity 106 may include or be in communication with one or more input elements, such as a keyboard input, a mouse input, a touch screen/display input, motion input, movement input, audio input, pointing device input, joystick input, keypad input, and/or the like. The data analysis computing entity 106 may also include or be in communication with one or more output elements (not shown), such as audio output, video output, screen/display output, motion output, movement output, and/or the like.

Exemplary External Computing Entity

FIG. 3 provides an illustrative schematic representative of an external computing entity 102 and/or game control device 150 that can be used in conjunction with embodiments of the present invention. In general, the terms device, system, computing entity, entity, and/or similar words used herein interchangeably may refer to, for example, one or more computers, wearable devices, computing entities, desktops, mobile phones, tablets, notebooks, laptops, keyboards, mouses, keypads, console controllers, VR headsets, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. External computing entities 102 can be operated by various parties. As shown in FIG. 3, the external computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the external computing entity 102 may be capable of operating with one or more air interface standards, communication protocols, modulation types, and access types. More particularly, the external computing entity 102 may operate in accordance with any of a number of wireless communication standards and protocols, such as those described above with regard to the data analysis computing entity 106. In a particular embodiment, the external computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 102 may operate in accordance with multiple wired communication standards and protocols, such as those described above with regard to the data analysis computing entity 106 via a network interface 320.

Via these communication standards and protocols, the external computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 102 can also download changes, add-ons, and updates, for instance, to its firmware, software (e.g., including executable instructions, applications, program modules), and operating system.

According to one embodiment, the external computing entity 102 may include location determining aspects, devices, modules, functionalities, and/or similar words used herein interchangeably. For example, the external computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the external computing entity's 102 position in connection with a variety of other systems, including cellular towers, Wi-Fi access points, and/or the like. Similarly, the external computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the external computing entity 102 to interact with and/or cause display of information/data from the data analysis computing entity 106, as described herein. The user input interface can comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the external computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 102. As indicated, this may include a user application that is resident on the entity or accessible through a browser or other user interface for communicating with the data analysis computing entity 106 and/or various other computing entities.

In another embodiment, the external computing entity 102 may include one or more components or functionality that are the same or similar to those of the data analysis computing entity 106, as described in greater detail above. As will be recognized, these frameworks and descriptions are provided for exemplary purposes only and are not limiting to the various embodiments.

In various embodiments, the external computing entity 102 may be embodied as an artificial intelligence (AI) computing entity, such as an Amazon Echo, Amazon Echo Dot, Amazon Show, Google Home, and/or the like. Accordingly, the external computing entity 102 may be configured to provide and/or receive information/data from a user via an input/output mechanism, such as a display, a video capture device (e.g., camera), a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. Exemplary System Framework

As described below, various embodiments of the present invention address technical challenges related to dynamically determining one or more levels of game difficulty for a computer game associated with one or more dynamic difficulty tasks. For example, in some embodiments, proposed solutions disclose receiving a physiological evaluation data object from one or more physiological sensors and determining based at least in part on the physiological evaluation data object, one or more physiological difficulty level values. The one or more physiological difficulty level values may be used at least in part to determine one or more program control parameter values for one or more program control parameters associated with a computer game, which influence one or more dynamic difficulty tasks. In some embodiments, a game evaluation data object is also received from and one or more game difficulty level indications is determined based at least in part on the game evaluation data object. The one or more game difficulty level indications may be used at least in part to determine one or more program control parameter values for one or more program control parameters different from the one or more program control parameters determined based at least in part on the physiological evaluation data object. User interface data may be generated to enable rendering of an in-game experience of the computer game as adjusted by the one or more control parameter values. In doing so, various embodiments of the present invention address shortcomings of existing computer game difficulty determination and allow for the consideration of physiological measurements of a particular user when determining computer game difficulty. As such, a computer game may adjust the game difficulty associated with one or more dynamic difficulty tasks to promote increased user learning retention and building of neural pathways.

Moreover, various embodiments of the present invention address technical challenges related to efficiency and reliability of computer game platforms by enabling dynamic adjustment of game difficulty. For example, various game platforms that do not dynamically adjust game difficulty suffer from efficiency and reliability drawbacks resulting from users aborting games with unsuitable difficulty modes and restarting games with different difficulty modes, operations that can impose significant computational burdens on the game platforms. Various embodiments of the present invention reduce or eliminate the number of abort/restart operations and in doing so improve efficiency and reliability of computer game platforms.

FIG. 4 is a flowchart diagram of an example process 400 for generating user interface data to enable rendering of a dynamic in-game experience of a computer game in accordance with one or more dynamically-adjustable program control parameter values. Via the various steps/operations of process 400, the data analysis computing entity 106 may process a physiological evaluation data object to determine one or more physiological difficulty levels and subsequently one or more program control parameter values for one or more program control parameter values. The data analysis computing entity 106 may then generate user interface data for a computer game to enable rendering of an in-game experience adjusted by the one or more determined program control parameter values. The various steps/operations of process 400 may occur during a user interaction session with a particular computer game.

At step/operation 401, the game generation engine 110 of the data analysis computing entity 106 receives a physiological evaluation data object from one or more physiological sensors. In some embodiments, the physiological evaluation data object includes one or more physiological evaluation measurements for a user during a user interaction session. In some embodiments, the game generation engine 110 may receive the physiological evaluation data object in response to a user beginning a user interaction session with a computer game. For example, when a user selects a computer game from a library of one or more computer games, a user interaction session may begin, and a physiological evaluation data object may be received by the game generation engine 110. In some embodiments, the game generation engine 110 may receive a physiological evaluation data object for a user periodically, such as every few milliseconds, seconds, minutes, and/or the like. In some embodiments, the duration between receiving two consecutive physiological evaluation data objects may be determined based at least in part on an associated frame rate of the computer game. In some embodiments, the one or more physiological evaluation measurements are each associated with a timestamp indicative of when the physiological evaluation measurement was measured. As such, the user's physiological evaluation measurements may be tracked over time to determine changes in one or more physiological evaluation measurements for the user during the user interaction session The physiological evaluation data object may be received from one or more physiological sensors associated with the user. In some embodiments, the one or more physiological sensors may include a set of sensors associated with a wearable device configured to measure one or more physiological evaluation measurements, including but not limited to a user heart rate, blood pressure, breathing rate, skin perspiration, pupil dilation, and/or the like.

In some embodiments, the one or more physiological evaluation measurements described by the physiological evaluation data object may be stored in an associated memory, such as storage subsystem 108. In some embodiments, the one or more physiological evaluation measurements may be stored as part of an associated user profile for a user. The user may select and/or login to an associated user profile before, during, or after a user interaction session. In some embodiments, the game generation engine may generate a physiological summary for a user over a period of time such that a user may view one or more associated physiological evaluation measurements over one or more user interaction sessions for a particular computer game.

At step/operation 402, the game generation engine 110 of the data analysis computing entity 106 determines one or more physiological difficulty level values based at least in part on the physiological evaluation data object. In some embodiments, the one or more physiological difficulty level values are determined based at least in part on one or more physiological evaluation measurements described by the physiological evaluation data object. In some embodiments, a particular computer game may be associated with one or more algorithms which use one or more physiological evaluation measurements of a user to determine particular physiological difficulty levels. The one or more algorithms may describe one or more mathematical and/or logical operations that are configured to be performed on one or more physiological evaluation measurements for a user in order to generate one or more physiological difficulty level values. The result may be the one or more physiological difficulty level values. For example, one or more physiological difficulty level values may be determined by multiplying a user heart rate value described by a user heart rate physiological evaluation measurement by a coefficient value described by the corresponding algorithm for the particular physiological difficulty level. In some embodiments, the one or more physiological difficulty level values is a continuous value or discrete value. In some embodiments, the one or more physiological difficulty level values may be rounded using one or more defined rounding operations, such as by using floor or ceiling functions, or otherwise transformed into a discrete value.

An operational example of a physiological difficulty level is the output of a proportional-integral-derivative (PID) controller that is determined based at least in part on a user's heart rate. For example, the PID controller output may be determined in a manner such that the setpoint of the PID controller output is 105% of the user's baseline heart rate, where the proportional, integral, and derivative gains of the PID controller are set at 0.5, 0.0, and 0.0 respectively, and where the minimum and maximum value for the PID controller outputs are −2 and +2 respectively. Another example of a physiological difficulty level is a measure that indicates whether a detected heart rate of a user satisfies a heart rate threshold. A yet another example of a physiological difficulty value is a measure of a ratio between an observed heart rate value of a user and a maximum observed heart rate value of a user.

In some embodiments, step/operation 402 may be performed in accordance with the various steps/operations of the process 500 that depicted in FIG. 5, which is a flowchart diagram of an example process for determination of one or more physiological difficulty level values for a user interaction session for a computer game.

At step/operation 501, the game generation engine 110 of the data analysis computing entity 106 determines one or more baseline physiological evaluation measurements for a user. In some embodiments, determining the one or more baseline physiological evaluation measurements for the user is performed based at least in part on receiving one or more physiological evaluation measurements from the one or more physiological sensors when the user is not performing one or more dynamic difficulty tasks associated with the computer program. For example, the one or more baseline physiological evaluation measurements for a user may correspond to a time period prior to the user entering into a user interaction session with a computer game. In some embodiments, the user interaction session may include a rest period where the user is not prompted to complete any dynamic difficulty tasks. In some embodiments, the rest period of the computer game experience may occur at the onset of selection of the user interaction setting and prior to presenting the user with any dynamic difficulty tasks. In some embodiments, during the rest period of the user interaction session, the user may be informed that one or more baseline physiological measurements are being collected/recorded/obtained. In some embodiments, the user may be presented with values of his/her corresponding baseline physiological evaluation measurements such that he/she is made aware of his/her physiological measurements at rest.

At step/operation 502, the game generation engine 110 of the data analysis computing entity 106 determines the one or more physiological difficulty level values based at least in part on a relationship between the one or more physiological evaluation measurements and the one or more baseline physiological evaluation measurements for the user. In some embodiments, the relationship between the one or more physiological evaluation measurements and the one or more baseline physiological evaluation measurements for the user may be determined by using one or more mathematical and/or logical operations. For example, one or more physiological difficulty level values may be determined based at least in part on the difference between a physiological heart rate control physiological evaluation measurement value as received from a physiological evaluation data object during a user interaction session and a heart rate baseline physiological evaluation measurement value. In some embodiments, one or more physiological difficulty level values reflect a deviation between a current time physiological property when a user is experiencing a heightened physiological state compared to the user's normal physiological state, where the noted deviation may indicate a negative emotional state, such as a stress state, at the current.

At step/operation 403, the game generation engine 110 of the data analysis computing entity 106 receives a game evaluation data object. In some embodiments, the game evaluation data object is configured to describe one or more game evaluation measurements associated with a user during a user interaction session. In some embodiments, the game generation engine 110 may receive the game evaluation data object in response to a user beginning a user interaction session with a computer game. For example, when a user selects a computer game from a library of one or more computer games, a user interaction session may begin, and a game evaluation data object may be received by the game generation engine 110. In some embodiments, the game generation engine 110 may receive a game evaluation data object for a user periodically, such as every few milliseconds, seconds, minutes, and/or the like. In some embodiments, the duration between receiving two consecutive game evaluation data objects may be determined based at least in part on an associated frame rate of the computer game. In some embodiments, the one or more game evaluation measurements are each associated with a time stamp indicative of when the game evaluation measurement was measured. As such, the user's game evaluation measurements may be tracked over time to determine changes in one or more game evaluation measurements for the user during the user interaction session. In some embodiments, a user's game evaluation measurements may be tracked with respect a user's physiological evaluation measurements.

The game evaluation data object may be received from one or more external computing entities associated with the user interaction session. In some embodiments, the one or more game evaluation measurements may be determined based at least in part on user input data provided via one or more game control devices. In some embodiments, the one or more game evaluation measurements may be indicative of the user's performance with respect to one or more dynamic difficulty tasks associated with the computer program. In some embodiments, a game evaluation measurement may correspond to an accuracy, precision, and/or speed associated with the user completing the one or more dynamic difficulty tasks associated with the computer game.

In some embodiments, the one or more game evaluation measurements described by the game evaluation data object may be stored in an associated memory, such as storage subsystem 108. In some embodiments, the one or more game evaluation measurements may be stored in an associated user profile. The user may select and/or login to an associated user profile before, during, or after a user interaction session. In some embodiments, the game generation engine may generate a game summary for a user over a period of time such that a user may view one or more associated game evaluation measurements over one or more user interaction sessions with a particular game. In some embodiments, the game summary for the user over a period of time may also include a physiological summary for the user over time, such that a user may view one or more associated game evaluation measurements as well as one or more physiological evaluation measurements over one or more user interaction sessions with the particular game.

Operational examples of game evaluation measurements include a sliding value that describes how long a target is within a desirable region. Another operational example of game evaluation measurements include a measure of user accuracy in previous selections/attempts made during a defined period of time. A yet another operational example of game evaluation measurements includes a number of failed custom order fulfillments and/or a number of pending custom orders.

At step/operation 404, the game generation engine 110 of the data analysis computing entity 106 determine one or more performance-based difficulty level values based at least in part on the game evaluation data object. In some embodiments, the one or more performance-based difficulty level values are determined based at least in part on one or more game evaluation measurements described by the game evaluation data object. In some embodiments, a particular computer game may be associated with one or more algorithms which use one or more game evaluation measurements of a user to generate one or more performance-based difficulty level values. In some embodiments, a particular computer game may be associated with one or more algorithms which use one or more game evaluation measurements of a user to generate one or more performance-based difficulty level values. The one or more algorithms may describe one or more mathematical and/or logical operations to be performed on one or more game evaluation measurements for a user. The result may be the one or more performance-based difficulty level values. For example, one or more performance-based difficulty level values may be determined by multiplying a user precision value indicative of the percentage of the time the user has kept a user-controlled marble within one or more moving targets as described by a game evaluation measurement by a coefficient value described by the corresponding algorithm for the particular game difficulty level. The one or more performance-based difficulty level values may include a continuous value and/or discrete value. In some embodiments, the one or more performance-based difficulty level values may be rounded using one or more rounding operations, such as by using floor or ceiling functions.

An operational example of a game difficulty value is a game difficulty value that describes one or more game difficulty measures. Another operational example of a game difficulty value is the output of PID controller that is determined based at least in part on a past player performance measure. For example, the output of the a PID controller may be determined based at least in part on observed user accuracy with respect to completion of the dynamic difficulty tasks associated with the computer game. In some embodiments, the set point of the PID controller may be 0.5, the proportional, integral, and derivative gains of the PID controller may be set at 4.0, 0.0, and 0.0 respectively, and the minimum and maximum values of the PID controller may be −1 and +2 respectively.

At step/operation 405, the game generation engine 110 of the data analysis computing entity 106 determines one or more program control parameter values for one or more program control parameters associated with the computer program. In some embodiments, the one or more program control parameters for a particular computer game may be defined by computer game definition data. In some embodiments, a program control parameter may correspond to a physiological program control parameter and/or a performance-based program control parameter. If the program control parameter corresponds to a physiological program control parameter, the program control parameter may be determined based at least in part on one or more physiological difficulty level values. If the program control parameter corresponds to a performance-based program control parameter, the program control parameter may be determined based at least in part on one or more performance-based difficulty level values. Some program control parameters may correspond to both a physiological program control parameter and a performance-based program control parameter. Some program control parameters may not correspond to either a physiological program control parameter or a performance-based program control parameter.

In some embodiments, the one or more program control parameters may be defined for a particular computer game in the storage subsystem 108. In some embodiments, the one or more program control parameters may be determined based at least in part on the computer game definition data for the corresponding computer game. For example, the one or more program control parameters for an attention focus computer game may include an angular drag of the user-controllable marble, speed of the one or more moving targets, and the size of the one or more moving targets. As another example, the one or more program control parameters for a working memory computer game may include a transformer time duration and the number of colored receptacles. As another example, the one or more program control parameters for a stress management computer game may include an accumulation rate for an associated stress meter. As yet another example, the one or more program control parameters for a vagal response computer game may include an environmental clarity value, a count of bubbles at a given time, associated bubble speed, and a percentage of bubbles containing negative reward items.

In some embodiments, the one or more program control parameters may be determined based at least in part on one or more physiological difficulty level values and/or one or more performance-based difficulty level values corresponding to a user during a user interaction session with a particular computer game. In an instance when a program control parameter is continuous, the one or more physiological difficulty level values and/or one or more performance-based difficulty level values may be mapped directly to one or more program control parameter values such that the one or more physiological difficulty level values and/or one or more performance-based difficulty level values match the one or more program control parameter values.

In some embodiments, the one or more physiological evaluation measurements for the user interaction session comprise a heart rate measurement for the user; and the one or more game evaluation measurements for the user interaction session comprise a user-controlled marble precision with respect to one or more moving targets. In some of the noted embodiments, the one or more program control parameters comprise a first subset comprising a user-controlled marble drag and a moving target speed; the one or more program control parameters comprise a second subset comprising a moving target size; the first subset is determined based at least in part on the one or more physiological difficulty level values; and the second subset is determined based at least in part on the one or more performance-based difficulty level values. In some embodiments, the one or more physiological evaluation measurements for the user interaction session comprise a heart rate measurement for the user; and the one or more game evaluation measurements for the user interaction session comprise a placement accuracy measure describing an accuracy of previous placements by the user with respect to one or more colored receptacles. In some of the noted embodiments, the one or more program control parameters comprise a transformer time duration that is determined based at least in part on the heart rate measure; and the one or more program control parameters further comprise a number of colored receptacles that is determined based at least in part on the placement accuracy measure. In some embodiments, the one or more physiological evaluation measurements for the user interaction session comprise a heart rate measurement for the user; and the one or more game evaluation measurements for the user interaction session comprise a pending order count describing a number of pending custom item orders and a failed order count describing a number of failed custom item order fulfilments. In some of the noted embodiments, the one or more program control parameters comprise a stress meter accumulation rate that is determined based at least in part on the heart rate measurement, the pending order count, and the failed order count. In some embodiments, the one or more physiological evaluation measurements for the user interaction session comprise a heart rate measurement for the user; and the one or more game evaluation measurements for the user interaction session comprise a bubble interaction accuracy measure describing an accuracy of user interaction with respect to one or more interactable bubbles. In some of the noted embodiments, the one or more program control parameters comprise an environmental clarity that is determined based at least in part on the heart rate measurement; and the one or more program control parameters comprise a count of interactable bubbles, an interactable bubble speed, and a count of bubbles containing negative reward items, at least one of which is determined based at least in part on the bubble interaction accuracy measure.

In some embodiments, by dynamically adjusting program control parameters for a computer game, various embodiments of the present invention address technical challenges related to efficiency and reliability of computer game platforms by enabling dynamic adjustment of game difficulty. For example, various game platforms that do not dynamically adjust game difficulty suffer from efficiency and reliability drawbacks resulting from users aborting games with unsuitable difficulty modes and restarting games with different difficulty modes, operations that can impose significant computational burdens on the game platforms. Various embodiments of the present invention reduce or eliminate the number of abort/restart operations and in doing so improve efficiency and reliability of computer game platforms.

At step/operation 406, the game generation engine 110 of the data analysis computing entity 106 generates user interface data for the computer game. In some embodiments, the user interface data enables rendering of an in-game experience of the computer game (e.g., by an external computing entity 102). The in-game experience of the computer game may be adjusted by the one or more program control parameter values. In some embodiments, the difficulty associated with the one or more dynamic difficulty tasks of the computer game may be influenced by the one or more program control parameter values. In some embodiments, the game generation engine 110 may provide the generated user interface data to one or more external computing entities 102, where the external computing entities 102 may be configured to provide the in-game experience of the computer game for to user based at least in part on the user interface data provided by the game generation engine 110 of the data analysis computing entity 106. As such, the user may interact with the computer game during a user interaction session and the one or more difficulty tasks for the computer game may be adjusted based at least in part on the user's physiological measurements and/or game performance.

An operational example of an attention focus computer game 600 is depicted in FIG. 6. During a user interaction session with the attention focus computer game 600, a user may be presented with a user-controlled marble 601 on a user movable platform 602 with two moving marble targets 603. The one or more dynamic difficulty tasks may require a user to keep the user-controlled marble 601 in a region of the user movable platform 602 defined by the two moving targets 603 for a duration of time by controlling the user movable platform 602. Once a user successfully keeps the user-controlled marble 601 within moving target the defined region for the duration of time, the target may disappear, indicating successful completion of a dynamic difficulty task associated with the moving marble targets 603 moving target.

The one or more control parameters for the attention focus computer game 600 may include an angular drag of the user-controllable marble 601, a speed of the one or more moving targets 603, and the size of the one or more moving targets 603. The angular drag of the user-controllable marble 601 and the speed of the one or more moving targets 603 may be determined based at least in part on one or more physiological difficulty level values. In some embodiments, the one or more physiological difficulty level values are determined based at least in part on a user heart rate as described by a physiological evaluation data object. The size of the one or more moving targets 90 may be determined based at least in part on one or more performance-based difficulty level values. In some embodiments, the one or more performance-based difficulty level values are determined based at least in part on a user-controlled marble precision with respect to one or more moving targets as described by a game evaluation data object.

In some embodiments, the marble angular drag is determined based at least in part on the output of the equation 13–PID, while the target speed is determined based at least in part on the output of the equation 5–(4*(PID+10)/20). In some embodiments, PID is the output of a PID controller that is determined based at least in part on a user heart measure. In some embodiments, the set point of the PID controller is 105% of the user baseline heart rate. This means the PID controller will attempt to adjust difficulty to keep the user heart rate at the given set point. In some embodiments, he proportional, integral, and derivative gains are set at 6.0, 0.005, and 0.05. These values control the behavior of the PID controller and were decided by hand-tuning. In some embodiments, the minimum and maximum output of the PID controller was set at −10 and +10.

An operational example of a working memory computer game 700 is depicted in FIGS. 7A-7B. During a user interaction session with the working memory computer game 700, a user may be presented with one or more colored receptacles 701*a-c*, with each colored receptacle 701*a-c* being associated with a different color. After a period of time, the user may no longer be presented with the color of each colored receptacle and therefore must rely on his/her memory to determine the color corresponding to each colored receptacle 701*a-c*. After a transformer time duration is met, a transportation object 703 may provide a transformation object 702 associated with a new color not currently associated with one or more colored receptacles 701*a-c*, into one or more of the colored receptacles 701*a-c*, thus altering the associated color of the corresponding colored receptacle 701*a-c*. For example, a colored receptacle 701*b* may be associated with a red color. A transportation object 703 may then provide a transformation object 702 associated with a blue color to colored receptacle 701*b*, thus changing the color of the colored receptacle 701*b* from red to blue. The one or more dynamic difficulty tasks may require a user to place a colored placement item 704, which may correspond to a color that matches a color of a single colored receptacle 701*a-c*, into the corresponding colored receptacle 701*a-c*. For example, a colored placement item 704 may be associated with a green color, colored receptacle 701*a* may be associated with a red color, colored receptacle 701*b* may be associated with a yellow color, and colored receptacle 701*c* may be associated with a green color. As such, a user may successfully complete a dynamic difficulty task by placing the green colored placement item 704 into the green colored receptacle 701*c*.

The one or more control parameters for the working memory computer game 700 may include a transformer time duration and the number of colored receptacles. The transformer time duration may be determined based at least in part on one or more physiological difficulty level values. In some embodiments, the one or more physiological difficulty level values are determined based at least in part on a user heart rate as described by a physiological evaluation data object. In some embodiments, the transformer time duration is determined based at least in part on the output of the equation 5.5−PID, where the PID may be the output of a PID controller that is determined based at least in part on a user's heart rate. For example, the PID may be determined in a manner such that the setpoint of the PID is 105% of the user's baseline heart rate, where the proportional, integral, and derivative gains of the PID are set at 0.5, 0.0, and 0.0 respectively, and where the minimum and maximum value for the PID are −2 and +2 respectively.

The number of colored receptacles 702*a-c* may be determined based at least in part on one or more performance-based difficulty level values. In some embodiments, the one or more performance-based difficulty level values are determined based at least in part on an accuracy of a user's previous colored placement item placements with respect to one or more colored receptacles, as described by a game evaluation data object. In some embodiments, the number of colored receptacles is determined based at least in part on the output of 3+PID, where PID is the output of the a PID controller that is determined based at least in part on observed user accuracy with respect to completion of the dynamic difficulty tasks associated with the computer game. For example, the set point of the PID may be 0.5, the proportional, integral, and derivative gains of the PID may be set at 4.0, 0.0, and 0.0 respectively, and the minimum and maximum values of the PID may be −1 and +2 respectively.

An operational example of a stress management computer game 800 is depicted in FIG. 8. During a user interaction session with the stress management computer game 800, a user may be presented with one or more interactable ingredients 802*a-f* with which a user may construct a custom item 801. The user may also be presented with one or more custom item orders 803 to fulfill within an associated time frame 804. A stress meter (not shown) may accumulate over time and once an upper stress meter threshold has been satisfied, may trigger a superpower mode wherein the user may receive assistance in fulfilling the one or more custom item orders 803. The one or more dynamic difficulty tasks may require a user to correctly fulfill the one or more custom item orders 803 within the associated time frame 804. For example, a user may be prompted to fulfill a custom item order 803 which requires the interactable ingredients 802*a*, 802*b*, and 802*c* and has an associated time frame 804 of 30 seconds. As such, a user may successfully complete a dynamic difficulty task by creating a custom item 801 which includes interactable ingredients 802*a*, 802*b*, and 802*c* and presenting the custom item 801 to the custom item order 803 within 30 seconds. A user may fail a dynamic difficulty task by failing to create the correct custom item order 803 within the duration of time or attempting to fulfill the custom item order 803 with a custom item 801 with one or more incorrect interactable ingredients 802*a-e*.

The one or more control parameters for the stress management computer game 800 may include an accumulation rate for the stress meter that affects an accumulation rate of a "biostress meter," which may be a player-facing indicator that uses color to illustrate accumulated stress. The player may be rewarded for choosing to trigger "superpower mode" when the biostress meter is high. The biostress meter may be on a scale from 0 to 1, where higher values indicate more accumulated stress. The biostress meter may continuously accumulate through gameplay, and is only ever reduced back to zero by triggering superpower mode.

The stress meter accumulation rate may be determined based at least in part on one or more performance-based difficulty level values and one or more physiological difficulty values. In some embodiments, the one or more physiological difficulty level values are determined based at least in part on a user heart rate as described by a physiological evaluation data object. In some embodiments, the one or more performance-based difficulty level values are determined based at least in part on a number of pending custom item orders and a number of failed fulfillments of custom item orders as described by a game evaluation data object.

In some embodiments, if the user's heart rate is high, the biostress meter grows towards its zenith value, while if the user's heart rate is low, no biostress meter accumulation occurs. For example, in some embodiments, if a previous heart rate of a user satisfies a threshold (e.g., 105 percent of the user's baseline heart rate), the biostress meter accumulates at a defined rate (e.g., at a rate of 0.02 points per second).

In some embodiments, the stress meter accumulation rate is determined based at least in part on a number of pending custom item orders. For example, in some embodiments: (i) given zero to one pending custom item orders, the biostress meter accumulates 0.0002 points per second; (ii) given two pending custom orders, the biostress meter accumulates 0.004 points per second; (iii) given three pending custom orders, the biostress meter accumulates 0.01 points per second; and (iv) given four or more pending custom orders, the biostress meter accumulates 0.02 points per second.

In some embodiments, the stress meter accumulation rate is determined based at least in part on a number of failed custom item order fulfillments. In some embodiments, when a user fails a custom item order fulfillment, the biostress meter immediately accumulates 0.15 points. In some embodiments, if a failed custom order fulfilment is the second failed custom item order fulfilment in the last 30 seconds, there is a brief reprieve period. During this time, no new orders are introduced into the backlog. When the period expires, the interval between new orders is set at a more manageable pace (and slowly shrinks back down to hectic levels over time).

An operational example of a vagal response computer game 900 is depicted in FIGS. 9A-B. During a user interaction session with the vagal response computer game 900, a user may be presented with one or more interactable bubbles 901 which may contain a positive reward item 901a or negative reward item 901b. The one or more dynamic difficulty tasks may require a user to interact with as many interactable bubbles 901 which contain positive rewards items 901a and avoid interacting with interactable bubbles 901 which contain negative reward items 901b. In some embodiments, the clarity/visibility of the environment presented to the user may be altered to control the distance from which a user is able to perceive the bubbles 901 and/or the reward items contained within the bubbles 901. In an instance when a user interacts with an interactable bubble 901 containing a positive reward item 901a, the user gains the reward. For example, a user may add a coin to a coin stockpile. In an instance when a user interacts with an interactable bubble 901 containing a negative reward item 901b, the user is penalized. For example, a user may lose one or more coins from the coin stockpile.

The one or more control parameters for the vagal response computer game 900 may include an environmental clarity value, a count of bubbles at a given time, associated bubble speed, and a percentage of bubbles containing negative reward items. The environmental clarity may be determined based at least in part on one or more physiological difficulty level values. In some embodiments, the one or more physiological difficulty level values are determined based at least in part on a user heart rate as described by a physiological evaluation data object. The count of bubbles at a given time, the associated bubble speed, and a percentage of bubbles containing negative reward items may be determined based at least in part on one or more performance-based difficulty level values. In some embodiments, the one or more performance-based difficulty level values are determined based at least in part on an accuracy of user interaction with respect to one or more interactable bubbles as described by a game evaluation data object.

In some embodiments, the environmental clarity value (e.g., a fog intensity value for the environment) is determined based at least in part on a user heart rate. In some embodiments, the patient's heart rate value (HRV) is observed, and the highest observed value is cached as the HRV maximum variable. The user's current HRV is then divided by the HRV maximum variable and recorded in a ratio variable. The fog intensity may be a variable measured between 0 and 1 and is calculated using the function: (1−ratio)/0.2 (such that fog will be at full intensity when HRV drops to 20% or less than the maximum HRV). In some embodiments, if the fog intensity ever reaches the full value of 1, the game is paused and the user is given 20 seconds to focus on breathing. At the end of this duration, the HRV maximum variable is set to the patient's current HRV.

In some embodiments, the bubble speed value is determined based at least in part on a past user performance measure. In some embodiments, the user performance measure is a value between 0 and 1. This value persists between game frames and is a percentage of bubbles collected versus bubbles that escape the playfield unopened (where, in some embodiments, releasing a negative item counts as missing 5 coin bubbles in a row, and where the value of 5 may be smoothed using a simple low pass filter). In some embodiments, the user performance is used as the process variable in a PID controller. This PID controller has the following attributes: (i) the set point of the PID controller is 0.9; (ii) the proportional, integral, and derivative gains are set at 0.5, 0.0, and 0.0; and (iii) the minimum and maximum output of the PID controller is set at 0 and 1. Bubble speed may then be determined by the function: (7*PID output)+1. In some embodiments, this determination results in a bubble speed between 1 and 8 meters per second (where bubble spawning rate may be adjusted to match the determined bubble speed).

Accordingly, using the above-described techniques, various embodiments of the present invention address technical challenges related to dynamically determining one or more levels of difficulty for a computer game that is associated with one or more dynamic difficulty tasks. For example, in some embodiments, proposed solutions disclose receiving a physiological evaluation data object and/or a game evaluation data object during a user interaction session with a computer game. Based at least in part on the physiological evaluation data object and/or a game evaluation data object, one or more physiological difficulty level values and/or one or more performance-based difficulty level values may be determined. One or more program control parameter values for one or more program control parameters may be determined based at least in part on the one or more physiological difficulty level values and/or one or more performance-based difficulty level values, which may influence the in-game experience for a user. In this way, the difficulty of the one or more dynamic difficulty tasks for the computer game may be adjusted based at least in part on a physiological state of the user and/or the performance of the user with respect to the one or more dynamic difficulty tasks. As such, a user may learn more efficiently and have an overall more positive experience during a user interaction session with the computer game. In doing so, various embodiments of the present invention address shortcomings of existing difficulty determinations for computer games.

Thus, as described above, various embodiments of the present invention address technical challenges related to efficiency and reliability of computer game platforms by enabling dynamic adjustment of game difficulty. For example, various game platforms that do not dynamically adjust game difficulty suffer from efficiency and reliability drawbacks resulting from users aborting games with unsuitable difficulty modes and restarting games with different difficulty modes, operations that can impose significant computational burdens on the game platforms. Various embodiments of the present invention reduce or eliminate the number of abort/restart operations and in doing so improve efficiency and reliability of computer game platforms.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A computer-implemented method comprising:
    during a user interaction session with a computer program:
        receiving, by one or more processors, a physiological evaluation data object originating from one or more physiological sensors corresponding to the user interaction session, wherein the physiological evaluation data object comprises one or more physiological evaluation measurements for the user interaction session;
        determining, by the one or more processors and based on the physiological evaluation data object, one or more physiological difficulty level values;
        receiving, by the one or more processors, a program evaluation data object, wherein the program evaluation data object comprises one or more program evaluation measurements indicative of performance of the user with respect to one or more dynamic difficulty tasks associated with the computer program, wherein the one or more program evaluation measurements for the user interaction session comprise at least one of (a) a user-controlled marble precision with respect to one or more moving targets, (b) a placement accuracy measure describing an accuracy of previous placements by the user with respect to one or more colored receptacles, or (c) a pending order count describing a number of pending custom item orders and a failed order count describing a number of failed custom item order fulfilments;
        determining, by the one or more processors and based on the program evaluation data object, one or more performance-based difficulty level values;
        determining, by the one or more processors and based on the one or more physiological difficulty level values and the one or more performance-based difficulty level values, one or more program control parameter values for one or more program control parameters associated with the computer program; and
        generating, by the one or more processors, user interface data for the computer program, wherein the user interface data enables rendering an in-program experience of the computer program as adjusted by the one or more program control parameter values.

2. The computer-implemented method of claim 1, wherein:
    the one or more program evaluation measurements for the user interaction session comprise the user-controlled marble precision with respect to the one or more moving targets.

3. The computer-implemented method of claim 2, wherein:
    the one or more program control parameters comprise a first subset comprising a user- controlled marble drag and a moving target speed;
    the one or more program control parameters comprise a second subset comprising a moving target size;
    the first subset is determined based on the one or more physiological difficulty level values; and
    the second subset is determined based on the one or more performance- based difficulty level values.

4. The computer-implemented method of claim 1, wherein:
    the one or more program evaluation measurements for the user interaction session comprise the placement accuracy measure describing the accuracy of the previous placements by the user with respect to the one or more colored receptacles.

5. The computer-implemented method of claim 4, wherein:
    the one or more physiological evaluation measurements comprise a heart rate measurement;
    the one or more program control parameters comprise a transformer time duration that is determined based on the heart rate measurement; and
    the one or more program control parameters further comprise a number of colored receptacles that is determined based on the placement accuracy measure.

6. The computer-implemented method of claim 1, wherein:
    the one or more program evaluation measurements for the user interaction session comprise the pending order count describing the number of pending custom item orders and the failed order count describing the number of failed custom item order fulfilments.

7. The computer-implemented method of claim 6, wherein:
    the one or more physiological evaluation measurements comprise a heart rate measurement; and
    the one or more program control parameters comprise a stress meter accumulation rate that is determined based on the heart rate measurement, the pending order count, and the failed order count.

8. The computer-implemented method of claim 1, wherein:
    the one or more program evaluation measurements for the user interaction session comprise a bubble interaction accuracy measure describing an accuracy of user interaction with respect to one or more interactable bubbles.

9. The computer-implemented method of claim 8, wherein:
    the one or more physiological evaluation measurements comprise a heart rate measurement;
    the one or more program control parameters comprise an environmental clarity that is determined based on the heart rate measurement; and
    the one or more program control parameters comprise a count of interactable bubbles, an interactable bubble speed, and a count of bubbles containing negative reward items, at least one of which is determined based on the bubble interaction accuracy measure.

10. The computer-implemented method of claim 1, wherein the one or more physiological evaluation measurements further comprise at least one of a blood pressure measurement, a breathing rate measurement, or a skin perspiration measurement.

11. The computer-implemented method of claim 1, further comprising:
    determining, by the one or more processors, one or more baseline physiological evaluation measurements for the user,
    wherein determining the one or more physiological difficulty level values is based on a relationship between the one or more physiological evaluation measurements received during the user interaction session and the one or more baseline physiological evaluation measurements for the user.

12. An apparatus comprising one or more processors and at least one memory including program code, the at least one memory and the program code configured to, with the one or more processors, cause the apparatus to at least:
during a user interaction session with a computer program:
receive a physiological evaluation data object originating from one or more physiological sensors corresponding to the user interaction session, wherein the physiological evaluation data object comprises one or more physiological evaluation measurements for the user interaction session;
determine, based on the physiological evaluation data object, one or more physiological difficulty level values;
receive a program evaluation data object, wherein the program evaluation data object comprises one or more program evaluation measurements indicative of performance of the user with respect to one or more dynamic difficulty tasks associated with the computer program, wherein the one or more program evaluation measurements for the user interaction session comprise at least one of (a) a user-controlled marble precision with respect to one or more moving targets, (b) a placement accuracy measure describing an accuracy of previous placements by the user with respect to one or more colored receptacles, or (c) a pending order count describing a number of pending custom item orders and a failed order count describing a number of failed custom item order fulfilments;
determine, based on the program evaluation data object, one or more performance-based difficulty level values;
determine, based on the one or more physiological difficulty level values and the one or more performance-based difficulty level values, one or more program control parameter values for one or more program control parameters associated with the computer program; and
generate user interface data for the computer program, wherein the user interface data enables rendering an in-program experience of the computer program as adjusted by the one or more program control parameter values.

13. The apparatus of claim 12, wherein:
the one or more program evaluation measurements for the user interaction session comprise the user-controlled marble precision with respect to the one or more moving targets;
the one or more program control parameters comprise a first subset comprising a user-controlled marble drag and a moving target speed;
the one or more program control parameters comprise a second subset comprising a moving target size;
the first subset is determined based on the one or more physiological difficulty level values; and
the second subset is determined based on the one or more performance-based difficulty level values.

14. The apparatus of claim 12, wherein:
the one or more physiological evaluation measurements comprise a heart rate measurement;
the one or more program evaluation measurements for the user interaction session comprise the placement accuracy measure describing the accuracy of the previous placements by the user with respect to the one or more colored receptacles;
the one or more program control parameters comprise a transformer time duration that is determined based on the heart rate measurement; and
the one or more program control parameters further comprise a number of colored receptacles that is determined based on the placement accuracy measure.

15. The apparatus of claim 12, wherein:
the one or more physiological evaluation measurements comprise a heart rate measurement;
the one or more program evaluation measurements for the user interaction session comprise the pending order count describing the number of pending custom item orders and the failed order count describing the number of failed custom item order fulfilments; and
the one or more program control parameters comprise a stress meter accumulation rate that is determined based on the heart rate measurement, the pending order count, and the failed order count.

16. The apparatus of claim 12, wherein:
the one or more physiological evaluation measurements comprise a heart rate measurement;
the one or more program evaluation measurements for the user interaction session comprise a bubble interaction accuracy measure describing an accuracy of user interaction with respect to one or more interactable bubbles;
the one or more program control parameters comprise an environmental clarity that is determined based on the heart rate measurement; and
the one or more program control parameters comprise a count of interactable bubbles, an interactable bubble speed, and a count of bubbles containing negative reward items, at least one of which is determined based on the bubble interaction accuracy measure.

17. The apparatus of claim 12, wherein the at least one memory and the program code configured to, with the one or more processors, cause the apparatus to further:
determine one or more baseline physiological evaluation measurements for the user,
wherein determining the one or more physiological difficulty level values is based on a relationship between the one or more physiological evaluation measurements received during the user interaction session and the one or more baseline physiological evaluation measurements for the user.

18. A computer program product comprising at least one non-transitory computer-readable storage medium having computer-readable program code portions stored therein, the computer-readable program code portions configured to:
during a user interaction session with a computer program:
receive a physiological evaluation data object originating from one or more physiological sensors corresponding to the user interaction session, wherein the physiological evaluation data object comprises one or more physiological evaluation measurements for the user interaction session;
determine, based on the physiological evaluation data object, one or more physiological difficulty level values;
receive a program evaluation data object, wherein the program evaluation data object comprises one or more program evaluation measurements indicative of performance of the user with respect to one or more dynamic difficulty tasks associated with the computer program, wherein the one or more program evaluation measurements for the user interaction session comprise at least one of (a) a user-controlled marble precision with respect to one or more moving targets, (b) a placement accuracy measure describing an accuracy of previous placements by the user with respect to one or more colored receptacles, or (c) a pending order count describing a number of pending custom item orders and a failed order count describing a number of failed custom item order fulfilments;

determine, based on the program evaluation data object, one or more performance-based difficulty level values;

determining, based on the one or more physiological difficulty level values and the one or more performance-based difficulty level values, one or more program control parameter values for one or more program control parameters associated with the computer program; and generate user interface data for the computer program, wherein the user interface data enables rendering an in-program experience of the computer program as adjusted by the one or more program control parameter values.

19. The computer-implemented method of claim 1, wherein the one or more physiological evaluation measurements comprise one or more measurements related to at least one of heart rate, blood pressure, breathing rate, skin perspiration, or pupil dilation.

20. The computer program product of claim 18, wherein the one or more physiological evaluation measurements comprise one or more measurements related to at least one of heart rate, blood pressure, breathing rate, skin perspiration, or pupil dilation.

* * * * *

UNITED STATES PATENT AND TRADEMARK OFFICE
CERTIFICATE OF CORRECTION

PATENT NO. : 11,957,986 B2
APPLICATION NO. : 17/477138
DATED : April 16, 2024
INVENTOR(S) : Brendon Sean Hale et al.

It is certified that error appears in the above-identified patent and that said Letters Patent is hereby corrected as shown below:

In the Claims

In Column 29, Line 64, Claim 3, delete "user- controlled" and insert -- user-controlled --, therefor.

In Column 30, Line 4, Claim 3, delete "performance- based" and insert -- performance-based --, therefor.

Signed and Sealed this
Ninth Day of July, 2024

Katherine Kelly Vidal
*Director of the United States Patent and Trademark Office*